(12) United States Patent
Bergeron et al.

(10) Patent No.: US 10,564,724 B1
(45) Date of Patent: Feb. 18, 2020

(54) TOUCH-BASED INPUT DEVICE WITH HAPTIC FEEDBACK

(71) Applicant: Apple Inc., Cupertino, CA (US)

(72) Inventors: Kathleen A. Bergeron, Los Gatos, CA (US); Alex J. Lehmann, Sunnyvale, CA (US); Qiliang Xu, Livermore, CA (US); Zheng Gao, Sunnyvale, CA (US); Paul X. Wang, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 16 days.

(21) Appl. No.: 15/691,545

(22) Filed: Aug. 30, 2017

Related U.S. Application Data

(60) Provisional application No. 62/397,263, filed on Sep. 20, 2016.

(51) Int. Cl.
*G06F 3/038* (2013.01)
*G06F 3/01* (2006.01)
*G06F 3/0354* (2013.01)

(52) U.S. Cl.
CPC ............ *G06F 3/016* (2013.01); *G06F 3/0383* (2013.01); *G06F 3/03545* (2013.01); *G06F 2203/0381* (2013.01)

(58) Field of Classification Search
CPC ........... G05B 2219/40553; G06F 3/016; G06F 3/04886; B60W 50/16; F15B 13/14; H01H 13/85
See application file for complete search history.

(56) References Cited

U.S. PATENT DOCUMENTS

| | | | |
|---|---|---|---|
| 5,174,814 A * | 12/1992 | Burwell | B43K 8/003 |
| | | | 106/31.15 |
| 7,523,672 B2 | 4/2009 | Lapstun et al. | |
| 7,679,611 B2 | 3/2010 | Schena | |
| 8,395,587 B2 * | 3/2013 | Cauwels | G06F 3/016 |
| | | | 310/339 |
| 9,116,560 B1 * | 8/2015 | Habash | G06F 3/016 |
| 9,552,049 B1 * | 1/2017 | Butler | G06F 1/3259 |
| 10,120,446 B2 * | 11/2018 | Pance | G06F 3/016 |
| 2001/0050677 A1 | 12/2001 | Tosaya | |
| 2005/0248549 A1 * | 11/2005 | Dietz | G06F 3/016 |
| | | | 345/179 |

(Continued)

FOREIGN PATENT DOCUMENTS

| | | |
|---|---|---|
| CN | 102822784 A | 12/2012 |
| CN | 105068680 A | 11/2015 |

*Primary Examiner* — William Lu
(74) *Attorney, Agent, or Firm* — Morgan, Lewis & Bockius LLP

(57) ABSTRACT

An input device, such as a stylus, can include a piezoelectric device for providing haptic feedback and/or detecting user input. The piezoelectric device can be coupled to an inner surface of a housing of the stylus. The piezoelectric device can provide haptic feedback with a force to the housing when an electric voltage is applied to the piezoelectric device. The haptic feedback can provide information to the user relating operation of the stylus with an external device. The piezoelectric device can also produce an electric voltage when an input force is applied to an outer surface of the housing and transmitted to the piezoelectric device. The electric voltage can be used to detect tactile input from a user.

16 Claims, 17 Drawing Sheets

(56) References Cited

U.S. PATENT DOCUMENTS

| | | | |
|---|---|---|---|
| 2009/0002328 A1* | 1/2009 | Ullrich | G06F 3/016 345/173 |
| 2012/0026180 A1* | 2/2012 | Kuchenbecker | G06F 3/016 345/582 |
| 2012/0068957 A1 | 3/2012 | Puskarich et al. | |
| 2012/0206330 A1* | 8/2012 | Cao | G06F 3/0383 345/156 |
| 2012/0308291 A1* | 12/2012 | Weiner | B43K 29/00 401/195 |
| 2014/0043242 A1 | 2/2014 | Dietz et al. | |
| 2014/0253469 A1* | 9/2014 | Hicks | G06F 3/03545 345/173 |
| 2014/0267065 A1* | 9/2014 | Levesque | G06F 3/016 345/173 |
| 2015/0212578 A1 | 7/2015 | Lor et al. | |
| 2015/0331506 A1* | 11/2015 | Vandermeijden | G06F 3/041 345/179 |
| 2015/0363034 A1* | 12/2015 | Hinckley | G06F 3/0414 345/173 |
| 2016/0070373 A1* | 3/2016 | Hamaguchi | G06F 3/044 345/174 |
| 2016/0100244 A1* | 4/2016 | Gentile | H04R 1/1041 345/174 |
| 2016/0139690 A1 | 5/2016 | Chang | |
| 2016/0188015 A1* | 6/2016 | Song | G06F 3/016 345/179 |
| 2016/0282970 A1* | 9/2016 | Evreinov | G06F 3/03545 |
| 2017/0108928 A1* | 4/2017 | Clements | G06F 3/03545 |
| 2017/0176268 A1* | 6/2017 | Kihara | G01L 1/16 |
| 2017/0200881 A1* | 7/2017 | Gdala | G06F 3/044 |
| 2018/0011550 A1* | 1/2018 | Mihal | G06F 3/03545 |

\* cited by examiner

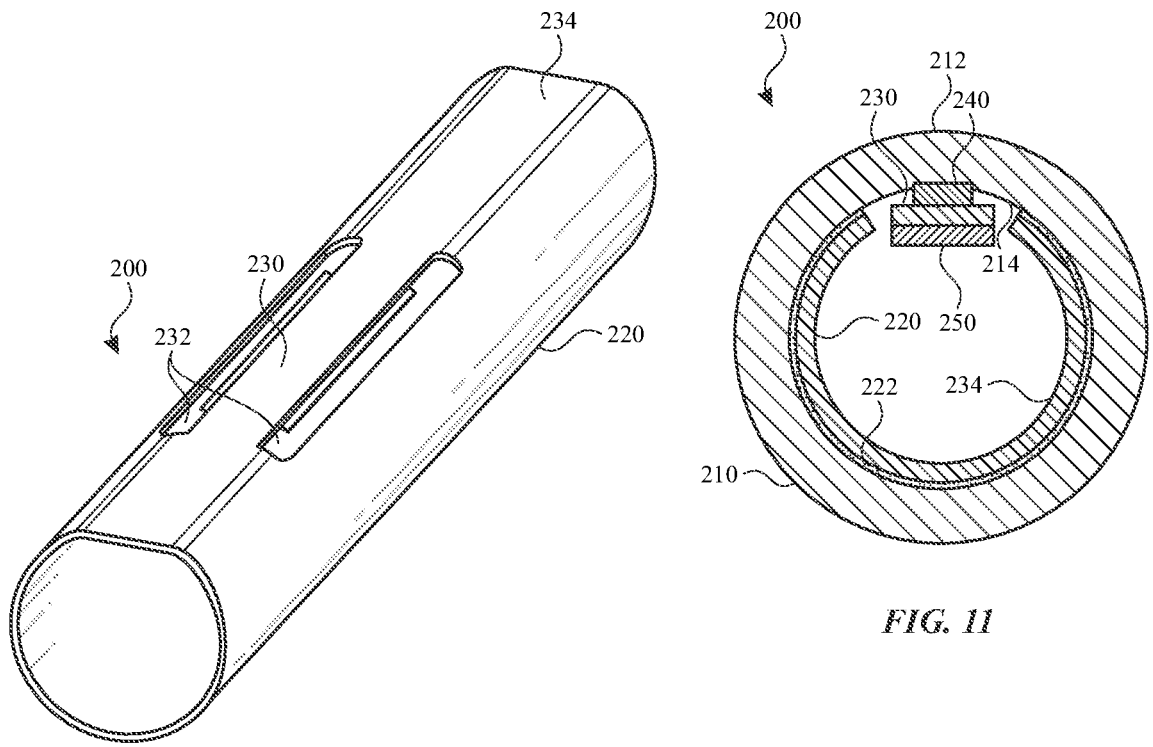
FIG. 10
FIG. 11
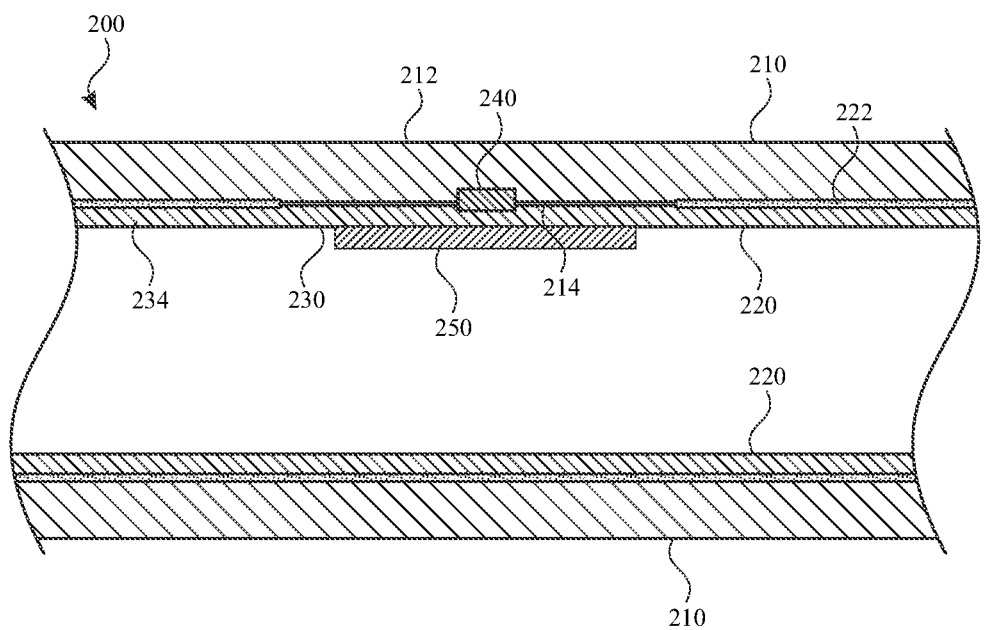
FIG. 12

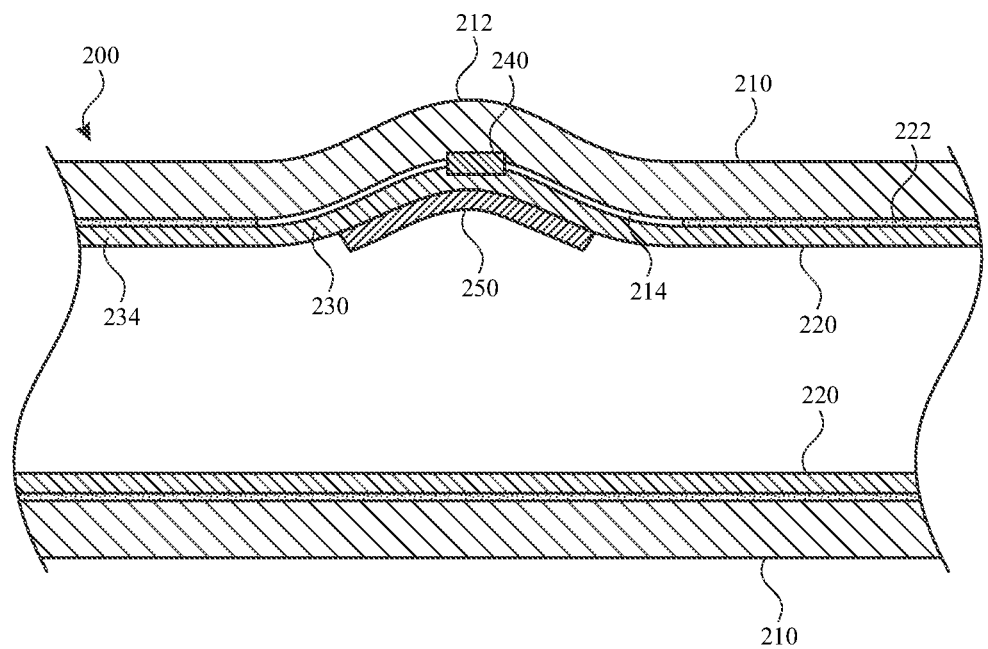
FIG. 13
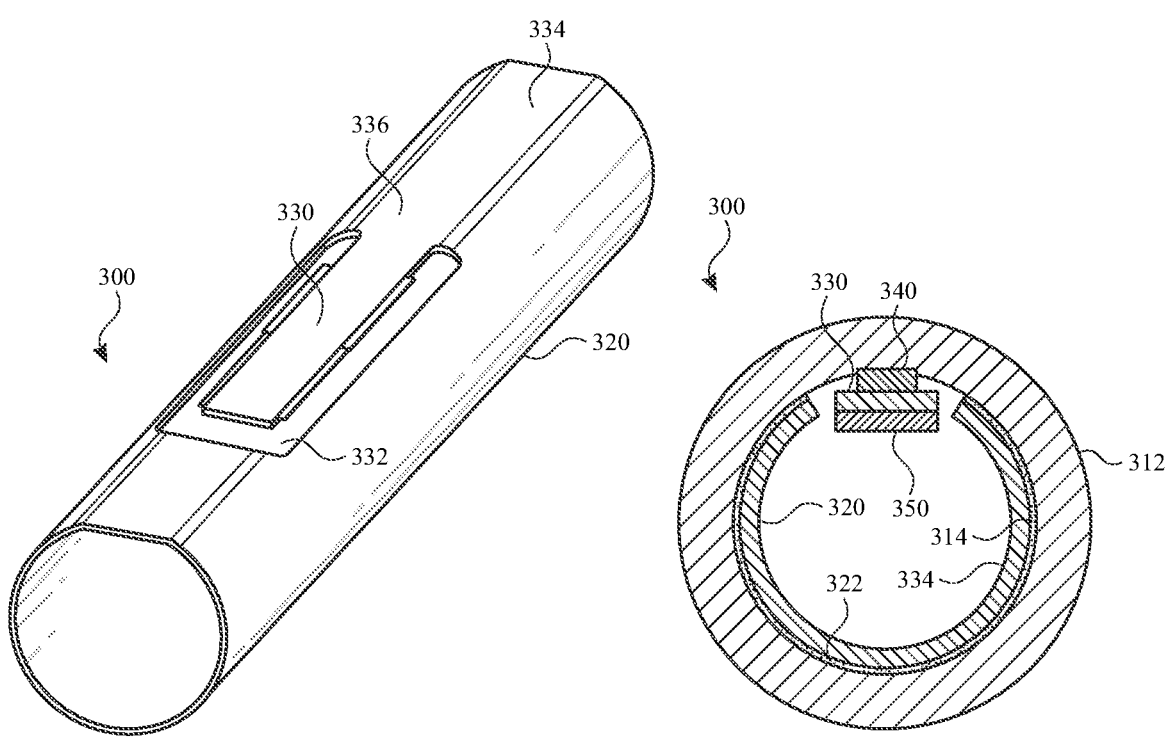
FIG. 14
FIG. 15

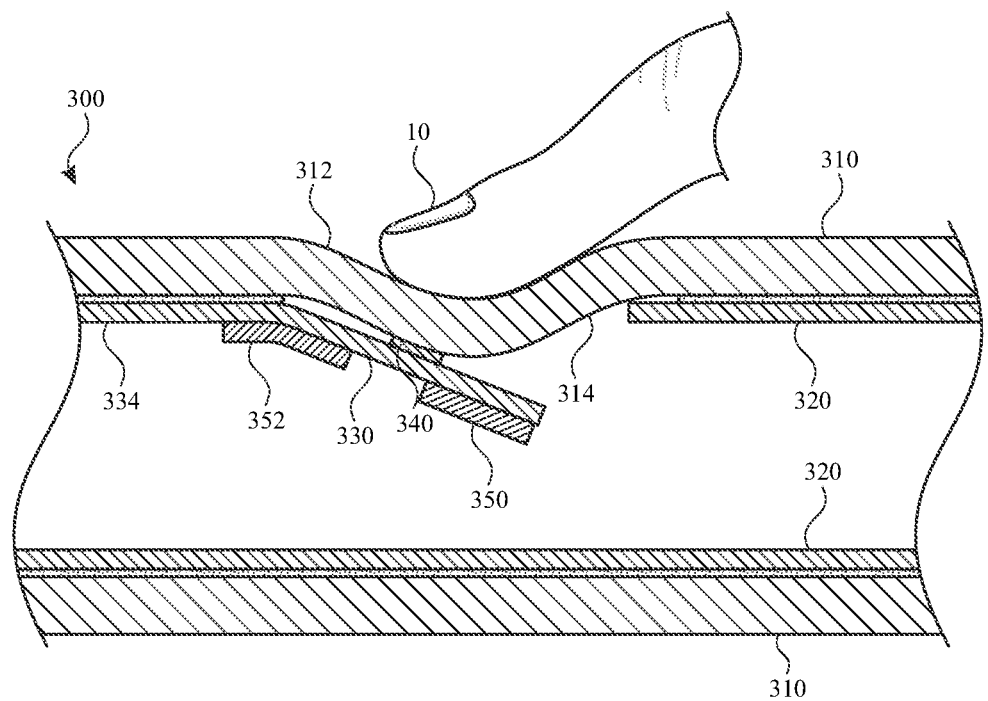
FIG. 18
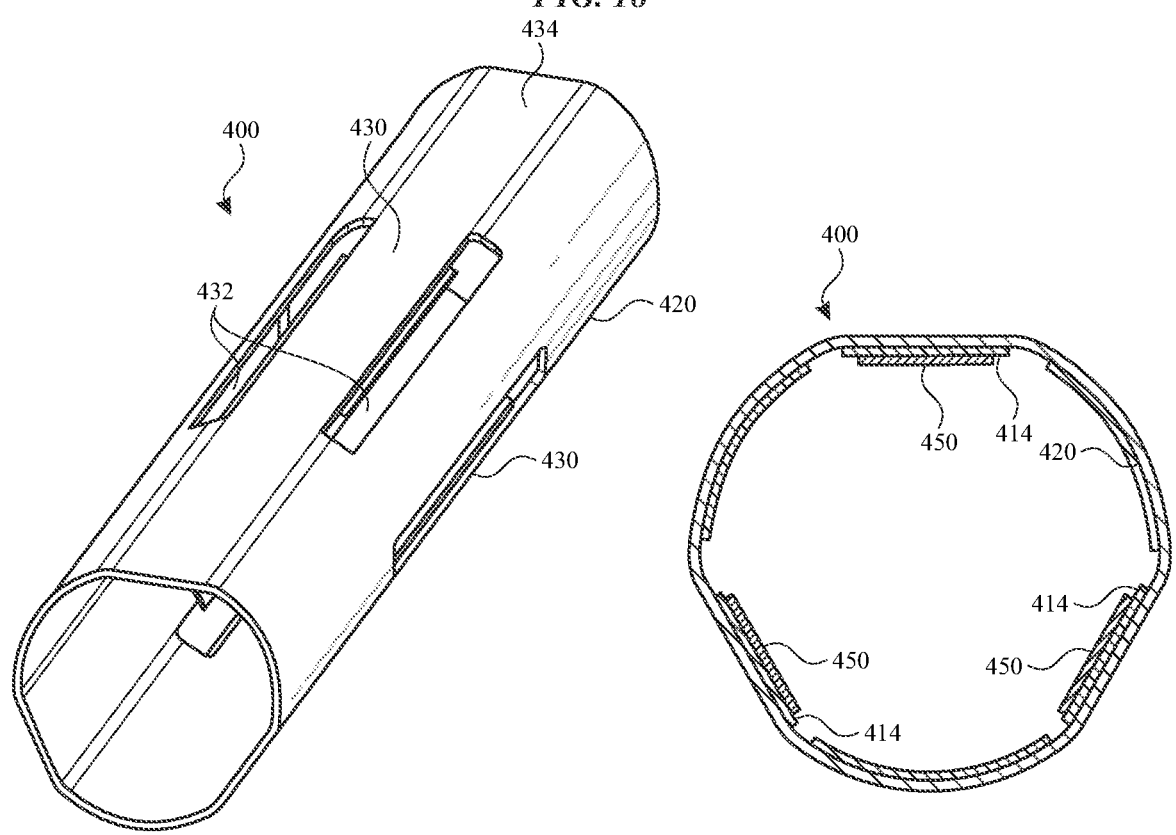
FIG. 19
FIG. 20

TOUCH-BASED INPUT DEVICE WITH HAPTIC FEEDBACK

CROSS-REFERENCE TO RELATED APPLICATION

This application claims the benefit of U.S. Provisional Application No. 62/397,263, entitled "TOUCH-BASED INPUT DEVICE WITH HAPTIC FEEDBACK," filed Sep. 20, 2016, the entirety of which is incorporated herein by reference.

TECHNICAL FIELD

The present description relates generally to touch-based input devices, such as styluses, and, more particularly, to touch-based input devices that can provide haptic feedback to a user.

BACKGROUND

A variety of handheld input devices exist for detecting input from a user during use. For example, a stylus can be utilized to provide input by contacting a touch panel of an electronic device. The touch panel may include a touch sensitive surface that, in response to detecting a touch event, generates a signal that can be processed and utilized by other components of the electronic device. A display component of the electronic device may display textual and/or graphical display elements representing selectable virtual buttons or icons, and the touch sensitive surface may allow a user to navigate the content displayed on the display screen. Typically, a user can move one or more input devices, such as a stylus, across the touch panel in a pattern that the device translates into an input command.

BRIEF DESCRIPTION OF THE DRAWINGS

Certain features of the subject technology are set forth in the appended claims. However, for purpose of explanation, several embodiments of the subject technology are set forth in the following figures.

FIG. 10 illustrates a perspective view of a guidetube, according to some embodiments of the subject technology.

FIG. 11 illustrates a front sectional view of a stylus that includes the guidetube of FIG. 10, according to some embodiments of the subject technology.

FIG. 12 illustrates a side sectional view of the stylus of FIG. 11, with a piezoelectric device in a resting state, according to some embodiments of the subject technology.

FIG. 13 illustrates a side sectional view of the stylus of FIG. 11, with the piezoelectric device in an actuated state, according to some embodiments of the subject technology.

FIG. 14 illustrates a perspective view of a guidetube, according to some embodiments of the subject technology.

FIG. 15 illustrates a front sectional view of a stylus that includes the guidetube of FIG. 14, according to some embodiments of the subject technology.

FIG. 18 illustrates a side sectional view of the stylus of FIG. 15, with the piezoelectric device in a deformed state, according to some embodiments of the subject technology.

FIG. 19 illustrates a perspective view of a guidetube, according to some embodiments of the subject technology.

FIG. 20 illustrates a front sectional view of a stylus that includes the guidetube of FIG. 19, according to some embodiments of the subject technology.

DETAILED DESCRIPTION

Figure 1:
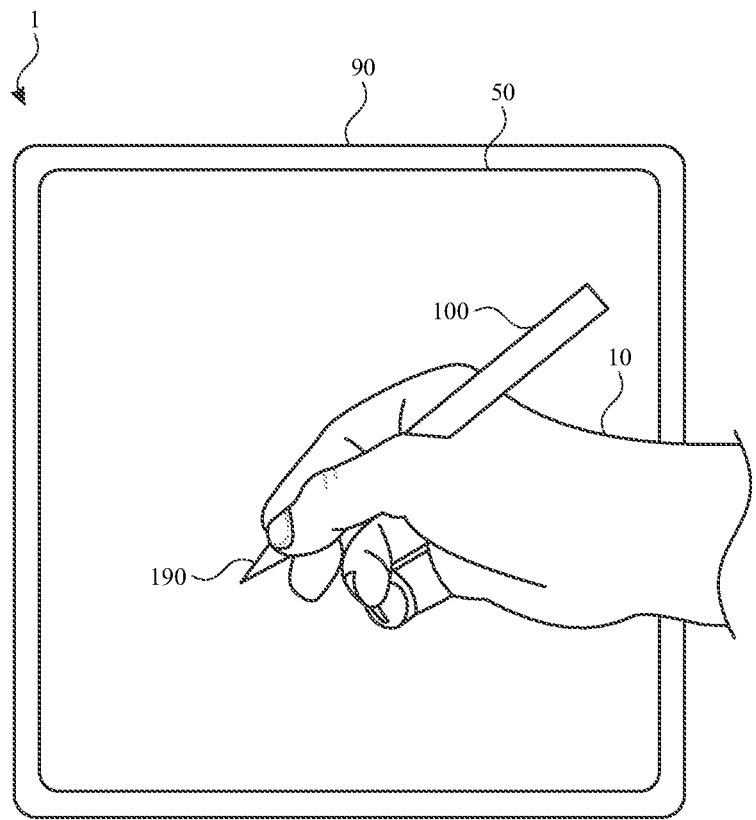
FIG. 1 illustrates a view of a system including a stylus and an external device, according to some embodiments of the subject technology.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Some electronic devices that include a display surface and/or a touch panel receive tactile input from a user and also provide haptic feedback to a user. For example, one or more vibration devices located under a touch panel of an electronic device can provide haptic feedback to a user by way of vibrations when the user is touching the touch screen. Such vibrations can be utilized to convey a variety of different information to a user, such as information regarding one or more touch inputs that a user has provided, alerts, or status of the electronic device or one or more applications executing thereupon.

Haptic feedback provided via devices with a display surface and/or a touch panel may not convey information adequately to a user when a stylus or other touch-based input device is utilized. In such a case, the user may not be directly touching the surface of the device that provides haptic feedback. As such, the user may not perceive the haptic feedback provided on the surface. Additionally, some existing styluses or other touch-based input devices may provide haptic feedback across an entirety of the device or at a location other than the user's natural grip location. Such configurations may require greater power consumption and larger haptic feedback components than would be required with components for providing haptic feedback locally at the location of the user's grip.

Furthermore, while the user is holding a stylus or other touch-based input device, the user may be limited to the input options provided thereby. Accordingly, additional input capabilities that are integrated into the input device would provide the user with expanded input capabilities without the need to simultaneously operate additional input devices. Some existing styluses or other touch-based input devices may require a user to operate input components that are at a location other than the user's natural grip location, thereby requiring that the user adjust the grip to provide the desired input.

In accordance with embodiments disclosed herein, improved touch-based input devices can receive tactile input from a user and can also provide haptic feedback to the user. Both the tactile input functions and the haptic feedback functions can be performed by one or more piezoelectric devices that are integrated into the input device. A piezoelectric device can be integrated into an input device in a low profile form that is more compact than many existing haptic feedback components, such as vibration motors. Haptic feedback can be focused to the user's natural grip location for more direct and efficient transmission. A piezoelectric device can also effectively sense user input passively to consume less power than many existing sensing components, such as strain gauges. Furthermore, a piezoelectric device can effectively detect a sudden tactile input from a user and disregard sustained tactile inputs that are provided while the user simply holds the input device at the user's natural grip location.

A touch-based input device in accordance with embodiments disclosed herein can include any device that is held, worn, or contacted by a user for providing input and/or receiving feedback. The touch-based input device can be used alone or in conjunction with another device. For example, FIG. 1 illustrates a system 1 including a stylus 100 and an external device 90 having a surface 50, according to some embodiments of the subject technology. The stylus 100 can be held by a user 10 and operate as a touch-based input device for use with the external device 90. The surface 50 can include a display surface and/or a touch panel for interacting with the stylus 100 when contacted thereby. For example, the stylus 100 can include a tip 190 for contacting the surface 50. Such contact can be detected by the external device 90 and/or the stylus 100. For example, the stylus 100 can include one or more sensors that detect when the tip 190 contacts the surface 50. Such sensors can include one or more contact sensors, capacitive sensors, touch sensors, cameras, piezoelectric sensors, pressure sensors, photodiodes, and/or other sensors operable to detect contact with the surface 50.

While some embodiments of touch-based input devices disclosed herein relate to styluses, it will be appreciated that the subject technology can encompass and be applied to other input devices. For example, an input device in accordance with embodiments disclosed herein can include a phone, a tablet computing device, a mobile computing device, a watch, a laptop computing device, a mouse, a game controller, a remote control, a digital media player, and/or any other electronic device. Further, the external device can be any device that interacts with a touch-based input device. For example, an external device in accordance with embodiments disclosed herein can include a tablet, a phone, a laptop computing device, a desktop computing device, a wearable device, a mobile computing device, a tablet computing device, a display, a television, a phone, a digital media player, and/or any other electronic device.

Figure 2:
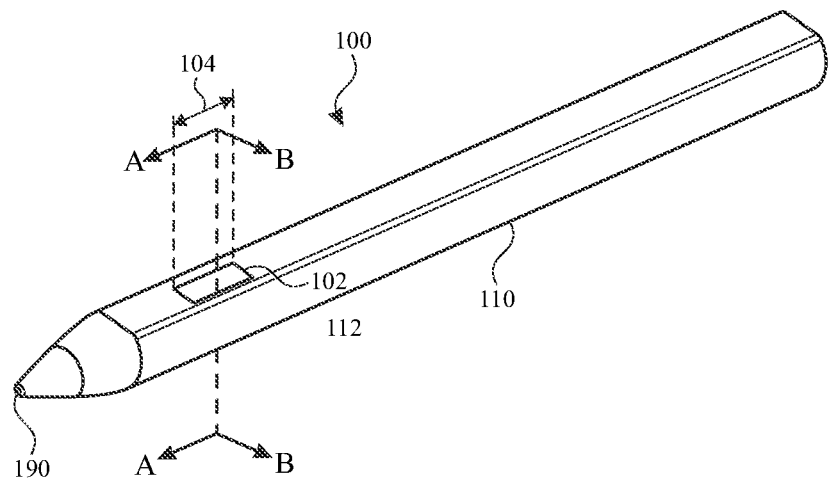
FIG. 2 illustrates a perspective view of the stylus of FIG. 1, according to some embodiments of the subject technology.

The stylus 100 can support handling and operation by a user. In particular, the stylus 100 can receive inputs from a user at a location of the user's grip and provide haptic feedback at the location of the user's grip. FIG. 2 illustrates a stylus 100, according to some embodiments of the subject technology. According to some embodiments, for example as illustrated in FIG. 2, the stylus 100 can include a housing 110 that provides an outermost cover along at least a portion of the length of the stylus 100. A user can grip the stylus 100 at a user grip region 104 during use of the stylus 100. The user grip region 104 can be located at a natural grip location, so that the user can provide inputs and receive haptic feedback at the same location that is grasped during normal use of the stylus 100. For example, the user grip region 104 can be located an outer surface 112 of the housing 110. The user grip region 104 can be near the tip 190 of the stylus 100. For example, the location of the user grip region 104 can be a distance from the tip 190 that is less than a half, a third, or a quarter of the total length of the stylus 100. At the user grip region 104, components of the stylus 100 can be positioned to provide haptic feedback to the user and/or receive tactile input from the user. For example, the user grip region 104 can be a portion of the housing 110. Alternatively or in combination, the user grip region 104 can include an input component 102 set within the housing 110, such as a button, switch, knob, lever, and/or another input component 102. According to some embodiments, a marker can be provided on the outer surface 112 as an indicator for the location of the user grip region 104. The marker can be flush with neighboring portions of the outer surface 112, such that it can be seen but provide the same tactile features as other portions of the housing 110. Alternatively or in combination, the marker can provide a protrusion, recess, or texture that provides surface features that are different from adjacent portions of the housing 110.

Figure 3:
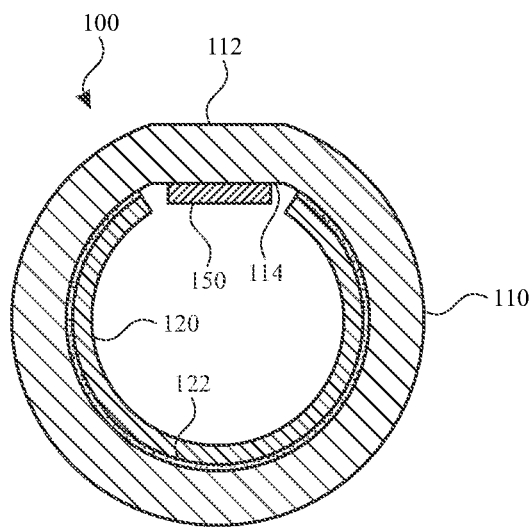
FIG. 3 illustrates a front sectional view of the section A-A of the stylus of FIG. 2, according to some embodiments of the subject technology.
Figure 4:
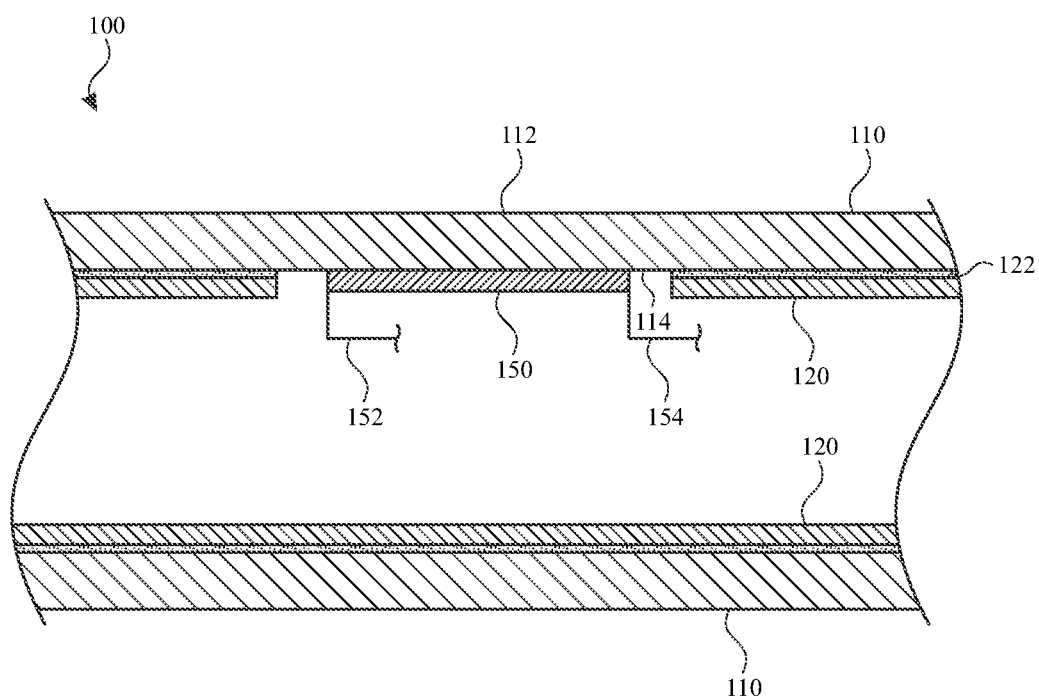
FIG. 4 illustrates a side sectional view of the section B-B of the stylus of FIG. 2, with a piezoelectric device in a resting state, according to some embodiments of the subject technology.

The stylus 100 can provide haptic feedback to the user at the user grip region 104 and/or receive tactile input from the user at the user grip region 104 with a piezoelectric device 150. FIGS. 3 and 4 illustrate front and side sectional views of the stylus 100, according to some embodiments of the subject technology. According to some embodiments, for example as illustrated in FIGS. 3 and 4, a piezoelectric device 150 can be coupled to the housing 110. The piezoelectric device 150, such as a piezo beam, strip, or disk, can be coupled directly to the inner surface 114 of the housing 110 or via an intervening structure that connects to the housing 110. The inner surface 114 of the housing 110 can be flat at the location of the piezoelectric device 150 to facilitate coupling and securement of the piezoelectric device 150. The outer surface 112 of the housing 110 can also be flat at the location of the piezoelectric device 150 as an indicator for guiding the user to a grip location.

Forces can be transmitted between the piezoelectric device 150 and the user grip region 104 at the outer surface 112 of the housing 110. The user grip region 104 of the housing 110 can be deformable at least at the location of the piezoelectric device 150 in response to a force applied to the outer surface 112 or the inner surface 114. At other regions of the housing 110, rigidity of the housing 110 can be greater or supplemented by additional structure. For example, a guidetube 120 can be provided within a space encompassed by the housing 110. The guidetube 120 can be coupled to the housing 110 with an adhesive layer 122. The guidetube 120 can provide an aperture extending therethrough to facilitate direct coupling of the piezoelectric device 150 to the inner surface 114 of the housing 110. The guidetube 120 can be more rigid than the housing 110. According to some embodiments, the housing 110, or a portion thereof, can be of a plastic (e.g., acrylonitrile butadiene styrene ("ABS")) or elastic material, and the guidetube 120, or a portion thereof, can be of a metallic material.

The piezoelectric device 150 can be of a material with piezoelectric properties. Exemplary materials include, for example, polymers such as polyvinylidene difluoride ("PVDF") and poly-L-lactide ("PLLA"). Other materials include ceramics (e.g., barium titanate, lead zirconate titanate ("PZT"), potassium niobate, sodium tungstate, zinc oxide), natural crystals (e.g., berlinite, cane sugar, quartz, Rochelle salt, topaz, and/or a tourmaline group mineral), and synthetic crystals (e.g., gallium orthophosphate and/or langasite). The surface area of the piezoelectric device 150 can be, for example, 10 square millimeters, 10 square micrometers, 10 square nanometers, or any other size that provides the functions described herein. The piezoelectric device 150 can have a shape that is rectangular, circular, ovular, triangular, elongated, or combinations thereof.

The piezoelectric device 150 can provide haptic feedback to a user. According to some embodiments, the haptic feedback can confirm that a user selection has been received by the external device 90. According to some embodiments, the haptic feedback can inform the user regarding status or operation of the external device 90. According to some embodiments, the haptic feedback can render texture sensations to simulate drawing on a textured surface with the stylus 100.

Figure 5:
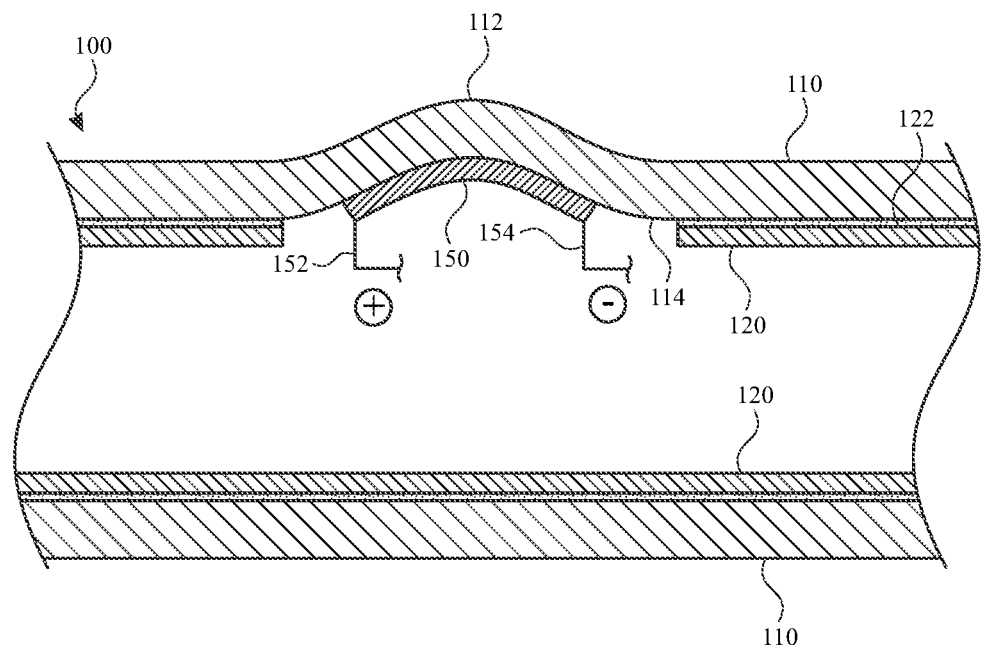
FIG. 5 illustrates a side sectional view of the stylus of FIG. 2, with the piezoelectric device in an actuated state, according to some embodiments of the subject technology.

Referring now to FIG. 5, with continued reference to FIGS. 3 and 4, illustrated is a view of the piezoelectric device 150 in an actuated state, according to some embodiments of the subject technology. According to some embodiments, for example as illustrated in FIG. 5, the piezoelectric device 150 provides a force to the user grip region 104 of the housing 110 when an electric voltage is applied to the piezoelectric device 150. Opposing sides of the piezoelectric device 150 can be connected to electrodes 152 and 154 that connect to positive and negative terminals of a voltage source. When a sufficient voltage is applied across the piezoelectric device 150, it actuates (e.g., deforms, expands, contracts, or flexes). The piezoelectric device 150 can be made to actuate in any direction. The amount of voltage required to actuate the piezoelectric device 150 may vary and may depend on the type of material used to manufacture the piezoelectric device 150. When no voltage is supplied by the voltage source, or when the voltage across the piezoelectric device 150 is less than the threshold amount of voltage required to actuate the piezoelectric device 150, the piezoelectric device 150 can return to its unactuated or resting state. The magnitude of expansion or contraction of the piezoelectric device 150 can be determined by the level or amount of voltage across the piezoelectric device 150, with a larger amount of voltage corresponding to a higher magnitude of expansion or contraction. Additionally, the polarity of the voltage across the piezoelectric device 150 may determine whether the piezoelectric device 150 contracts or expands.

According to some embodiments, the piezoelectric device 150 can be made to vibrate by applying a control signal to the piezoelectric device 150. The control signal may be a wave having a predetermined amplitude and/or frequency. When the control signal is applied, the piezoelectric device 150 may vibrate at the frequency of the control signal. The frequency can be in a range between 10 Hz and 5,000 Hz, 50 Hz and 1,000 Hz, or 100 Hz and 500 Hz. The frequency of the control signal may be adjusted to alter the rate of expansion and contraction of the piezoelectric device 150 if a certain vibration is desired. The amplitude of the control signal may be correlated to the magnitude of expansion or contraction of the piezoelectric device 150, and may be adjusted to alter the intensity of the vibration. The voltage can be in a range of between 0.1 and 4.4 V, 1.1 V and 3.3 V, or can be about 2.2 V.

The piezoelectric device 150 can receive and detect tactile input from a user. According to some embodiments, the user input can indicate a selection made by the user and transmitted to the external device 90. According to some embodiments, the user input can indicate that the external device 90 is to perform a corresponding action in response to subsequent inputs from the stylus 100. For example, the stylus 100 can be used to indicate markings when used on a surface of the external device 90, and the user input can indicate a selection of marking characteristics, such as shape, thickness, and color. According to some embodiments, the user input can select or alter a setting of the external device 90, such as a selection between markings (e.g., drawing mode) or erasing existing markings (e.g., eraser mode).

Figure 6:
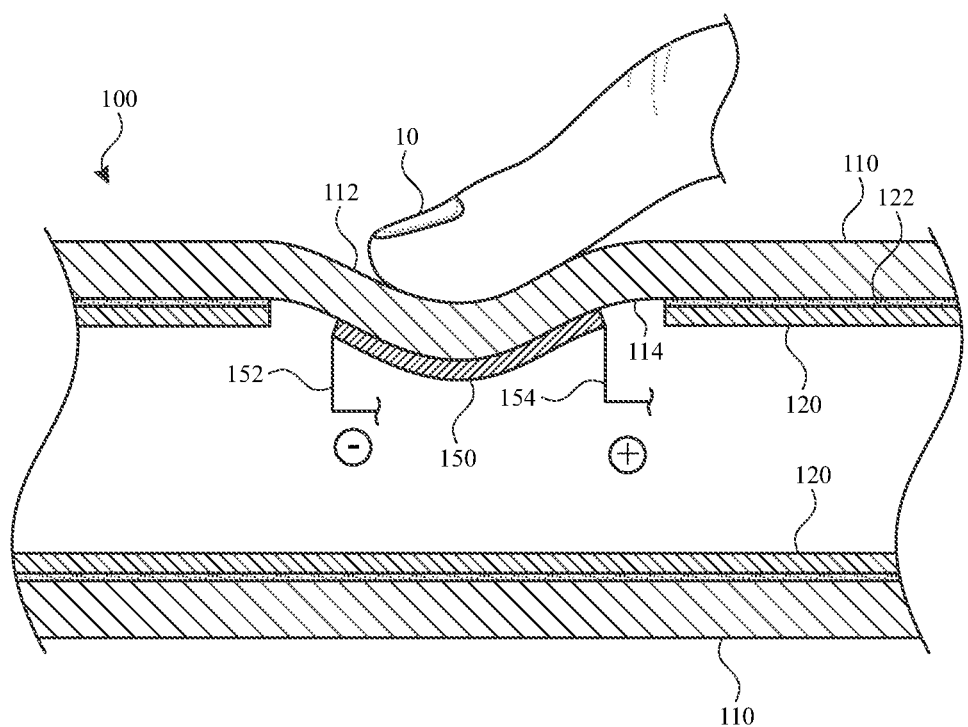
FIG. 6 illustrates a side sectional view of the stylus of FIG. 2, with the piezoelectric device in a deformed state, according to some embodiments of the subject technology.

Referring now to FIG. 6, with continued reference to FIGS. 2 and 3, illustrated is a view of the piezoelectric device 150 in a deformed state, according to some embodiments of the subject technology. According to some embodiments, for example as illustrated in FIG. 6, the piezoelectric device 150 produces an electric voltage when an input force is applied to an outer surface 112 of the housing 110 and transmitted to the piezoelectric device 150.

When the piezoelectric device 150 deforms, expands, contracts, or flexes based on a tactile input from a user 10, a voltage is produced across the piezoelectric device 150. The voltage can be detected and measured via the electrodes 152 and 154 connected to opposing sides of the piezoelectric device 150. Voltages can be produced based on deformation in one or more axes. The amount of deformation can generate a corresponding amount of voltage. The magnitude of the resulting voltage can be used to determine the force applied by the user 10. When no deformation is occurring, the voltage can decay. Unlike traditional strain gauge sensors, no external voltage need be applied to the piezoelectric device 150 to detect tactile inputs. Rather, the piezoelectric device 150 can passively remain in a rest state until a force is applied, whereupon a detectable voltage is produced by virtue of the piezoelectric properties of the piezoelectric device 150.

According to some embodiments, the stylus 100 can include one or more piezoelectric devices 150. Multiple piezoelectric devices 150 can be positioned within the stylus 100 at the same or different radial, circumferential, and/or longitudinal positions. The functions of providing haptic feedback to a user and detecting tactile input from a user can be performed by the same or different piezoelectric devices 150. Where these functions are provided by the same piezoelectric device 150, the haptic feedback function can be suspended while the piezoelectric device 150 is sensing a tactile input above a certain threshold. Where these functions are provided by the same piezoelectric device 150, the sensing function can be suspended while the piezoelectric device 150 is providing haptic feedback. Alternatively or in combination, the sensing function can be performed while the piezoelectric device 150 is providing haptic feedback, for example, by detecting a voltage across the piezoelectric device 150 and compensating for a known or expected offset due to performance of the haptic feedback function.

Figure 7:
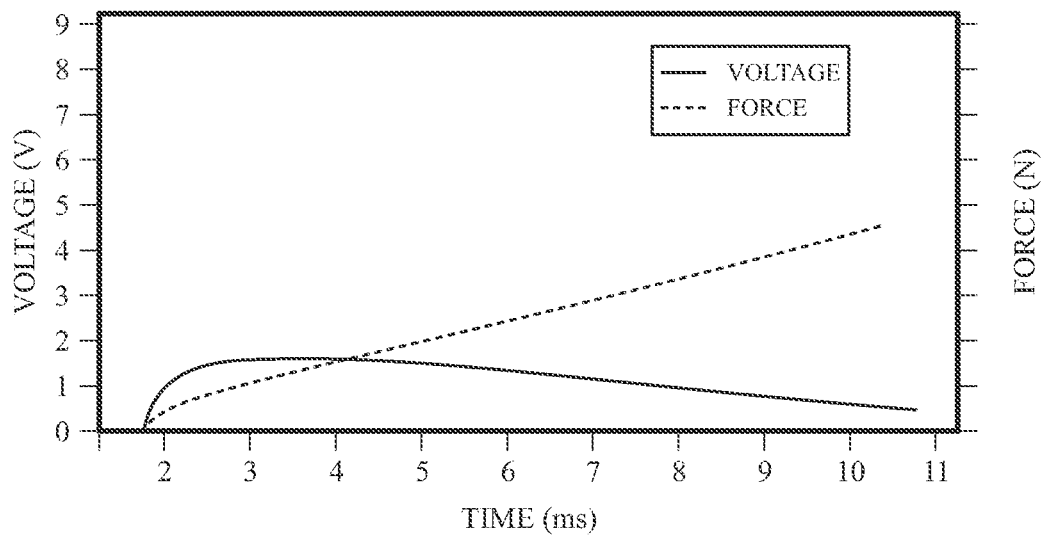
FIG. 7 illustrates a graph comparing forces applied to a piezoelectric device and output voltages of the piezoelectric device across a span of time, according to some embodiments of the subject technology.
Figure 8:
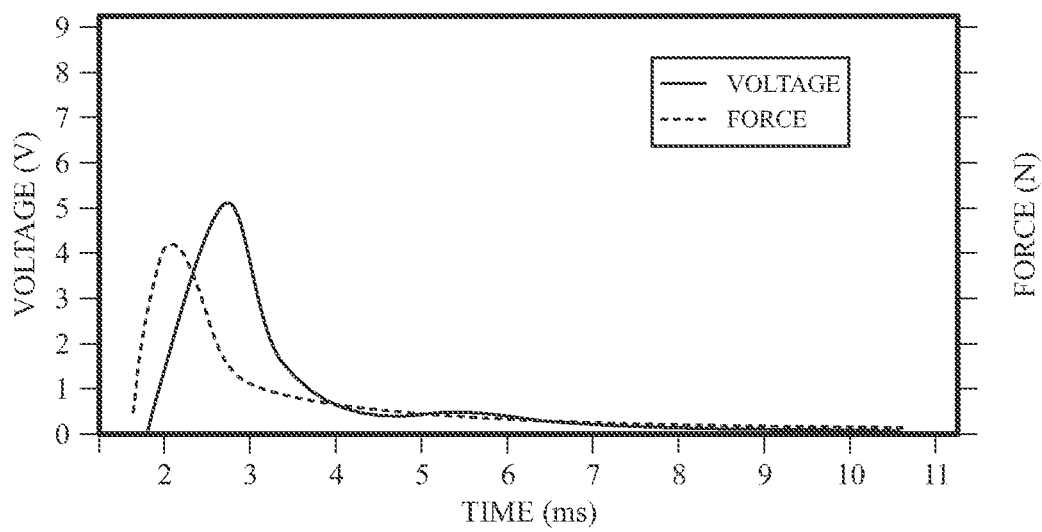
FIG. 8 illustrates a graph comparing forces applied to a piezoelectric device and output voltages of the piezoelectric device across a span of time, according to some embodiments of the subject technology.

The voltage produced by the piezoelectric device 150 gradually decays during application of sustained forces, such that gradually increasing forces tend to produce less voltage than a more abrupt force that achieves the same peak magnitude in less time. Referring now to FIGS. 7 and 8, illustrated are graphs comparing forces applied to a piezoelectric device and output voltages of the piezoelectric device across a span of time, according to some embodiments of the subject technology. FIG. 7 illustrates the results of a user-applied force that is typical of a user's normal grip during use of the stylus 100. As illustrated in FIG. 7, the user-applied force gradually increases over time. However, the voltage initially increases to a peak and subsequently decays despite the increasing force. Likewise, a sustained or constant user-applied force would produce an initial voltage that would eventually decay entirely. In contrast, FIG. 8 illustrates the results of a sudden user-applied force that is typical of a user's intentional input (e.g., tap, press, squeeze). As illustrated in FIG. 8, the user-applied force suddenly increases and subsequently decreases, thereby producing a more distinct force peak and a greater maximum voltage. As can be seen from these graphs, the voltage approximates the rate of change of the force more closely than it approximates the actual magnitude of the force. This feature of the piezoelectric device advantageously facilitates discernment between sustained forces resulting from a user's grip and a sudden force provided by the user. The system can be programmed to distinguish between gradual forces typical of a user's normal grip and sudden forces typical of a user-applied input by setting a threshold voltage. For example, the threshold voltage can be greater than a peak voltage such as that illustrated in FIG. 7 and less than a peak voltage such as that illustrated in FIG. 8. Based on these principles, a stylus and operating parameters can be calibrated according to desired outcomes.

Figure 9:
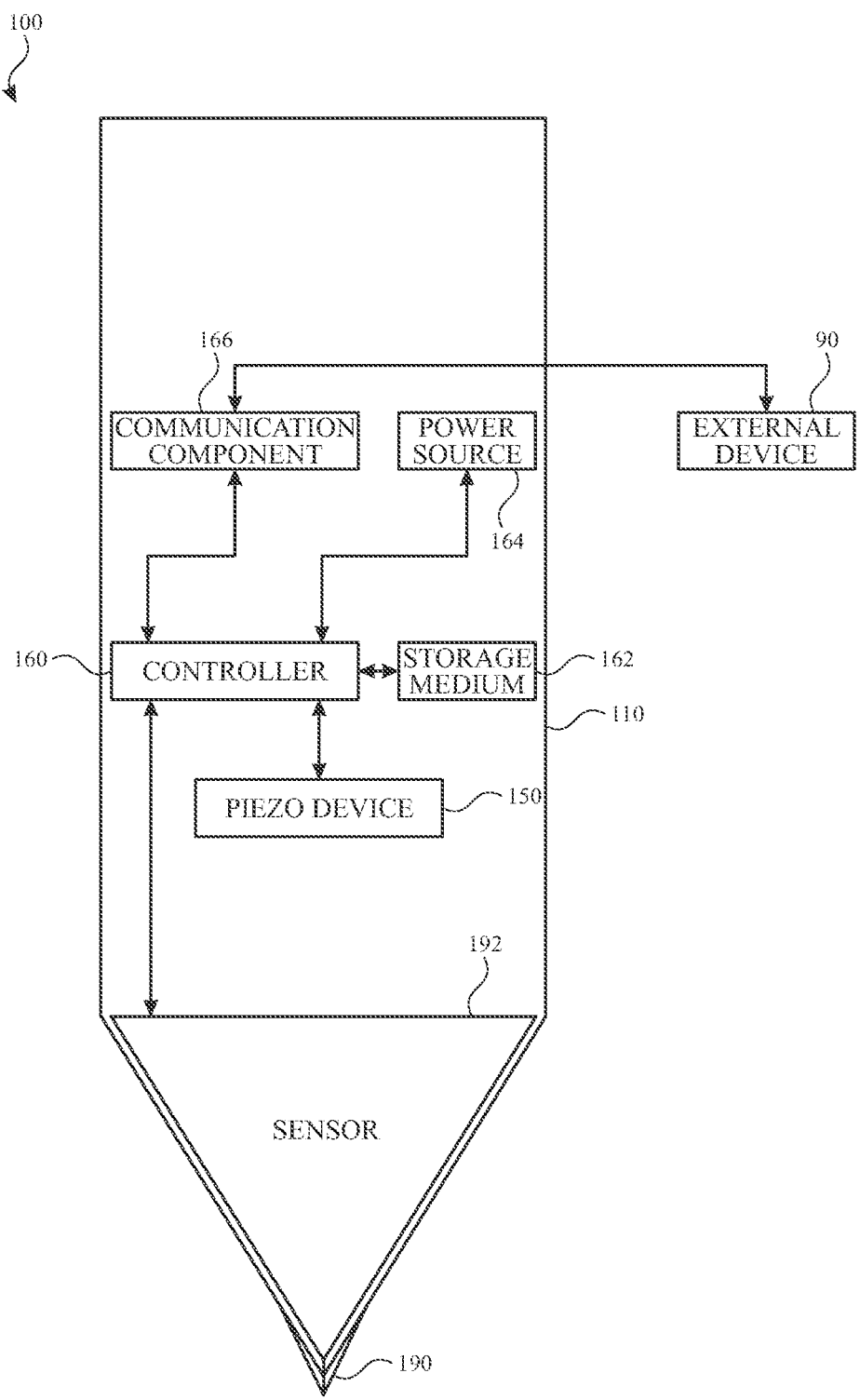
FIG. 9 illustrates a block diagram illustrating the stylus and the external device of FIG. 1, according to some embodiments of the subject technology.

The stylus 100 can be provided with components that facilitate the operation thereof, including use with an external device 90. FIG. 9 illustrates various components of the stylus 100, according to some embodiments of the subject technology.

According to some embodiments, the stylus 100 can include a tip sensor 192 at a tip 190 of the stylus 100 for sensing when the tip 190 is contacting a surface, such as the surface 50 of the external device 90. The tip sensor 192 can include one or more contact sensors, capacitive sensors, touch sensors, cameras, piezoelectric sensors, pressure sensors, photodiodes, and/or other sensors.

According to some embodiments, the stylus 100 can include a controller 106 and a non-transitory storage media 162. The non-transitory storage media 162 can include, for example, a magnetic storage medium, optical storage medium, magneto-optical storage medium, read-only memory, random access memory, erasable programmable memory, flash memory, or combinations thereof. According to some embodiments, the controller 106 can execute one or more instructions stored in the non-transitory storage medium 162 to perform one or more functions. For example, the non-transitory storage medium 162 can store one or more haptic profiles that the touch implement may utilize to simulate one or more textures. In some cases, the stylus 100 may retrieve a specific haptic profile utilizing one or more references and/or other codes detected from a surface utilizing the tip sensor 192 and/or received from an electronic device associated with the surface.

According to some embodiments, the stylus 100 can include a communication component 166 for communicating with the external device 90 and/or another device. The communication component 166 can include one or more wired or wireless components, WiFi components, near field communication components, Bluetooth components, and/or other communication components. The communication component 166 can include one or more transmission elements, such as one or more antennas. Alternatively or in combination, the communication component 166 can include an interface for a wired connection to the external device 90 and/or another device.

According to some embodiments, the stylus 100 can include a power source 164, such as one or more batteries and/or power management units. The stylus 100 can include components for charging the power source 164.

According to some embodiments, the stylus 100 can include other components including, for example, orientation detectors, gyroscopes, accelerometers, biometric readers, displays, sensors, switches (e.g., dome switches), buttons, voice coils, and/or other components.

A piezoelectric device can be supported on a portion of a guidetube within a housing. FIG. 10 illustrates a guidetube 220 of a stylus 200, according to some embodiments of the subject technology. The stylus 200 can be similar in some respects to the stylus 100 of FIGS. 1, 2, and 9 and therefore can be best understood with reference thereto. According to some embodiments, for example as illustrated in FIG. 10, the guidetube 220 includes a main body 234 and an extension arm 230 that extends from different portions of the main body 234. The extension arm 230 is separated from neighboring portions of the main body 234 by at least one gap 232. According to some embodiments, the extension arm 230 extends longitudinally alongside a pair of longitudinal gaps 232 to form a bridge between opposing portions of the main body 234.

Referring now to FIGS. 11 and 12, with continued reference to FIG. 10, illustrated are front and side sectional views of the stylus 200, according to some embodiments of the subject technology. According to some embodiments, for example as illustrated in FIGS. 11 and 12, the guidetube 220 can be provided within a space encompassed by the housing 210. The guidetube 220 can be coupled to the housing 210 with an adhesive layer 222. A piezoelectric device 250 can be disposed between ends of the extension arm 230 that connect to the main body 234, such that the piezoelectric device 250 is disposed away from portions of the extension arm 230 that connect to the main body 234. According to some embodiments, the outer surface 212 of the housing 210 and the inner surface 214 of the housing 210 can be curved. The extension arm 230 of the guidetube 220 can provide one or more flat surfaces for coupling to the piezoelectric device 250. According to some embodiments, the stylus 200 includes a force concentrator 240 between the housing 210 and the extension arm 230 of the guidetube 220. The force concentrator 240 can have a surface area that is smaller than a surface area of the piezoelectric device 250, to transmit forces between the housing 210 and the guidetube 220. Forces transmitted by the force concentrator are focused in a smaller area than would be by the piezoelectric device 250 alone.

The piezoelectric device 250 can provide haptic feedback to a user. Referring now to FIG. 13, with continued reference to FIGS. 11 and 12, illustrated is a view of the piezoelectric device 250 in an actuated state, according to some embodiments of the subject technology. According to some embodiments, for example as illustrated in FIG. 13, the piezoelectric device 250 provides a force to the housing 210 when an electric voltage is applied to the piezoelectric device 250. The force can be transmitted via the extension arm 230 of the guidetube 220 and the force concentrator 240. The gaps 232 surrounding the extension arm 230 provide flexibility to the extension arm 230 to facilitate deformation, expansion, contraction, or flexion thereof. According to some embodiments, the piezoelectric device 250 can also detect tactile input from a user. For example, the piezoelectric device 250 can produce an electric voltage when an input force is applied to an outer surface 212 of the housing 210 and transmitted to the piezoelectric device 250 via the force concentrator 240 and the extension arm 230 of the guidetube 220.

One or more piezoelectric devices can be supported on portions of a guidetube within a housing. FIG. 14 illustrates a guidetube 320 of a stylus 300, according to some embodiments of the subject technology. The stylus 300 can be similar in some respects to the stylus 100 of FIGS. 1, 2, and 9 and therefore can be best understood with reference thereto. According to some embodiments, for example as illustrated in FIG. 14, the guidetube 320 includes a main body 334 and an extension arm 330 that extends from a portion of the main body 334. The extension arm 330 extends from the main body 334 at a single region of attachment thereto. The extension arm 330 is surrounded on multiple sides by the gap 332, such that the extension arm 330 can bend and flex at the junction 336 between the extension arm 330 and the main body 334.

Figure 16:
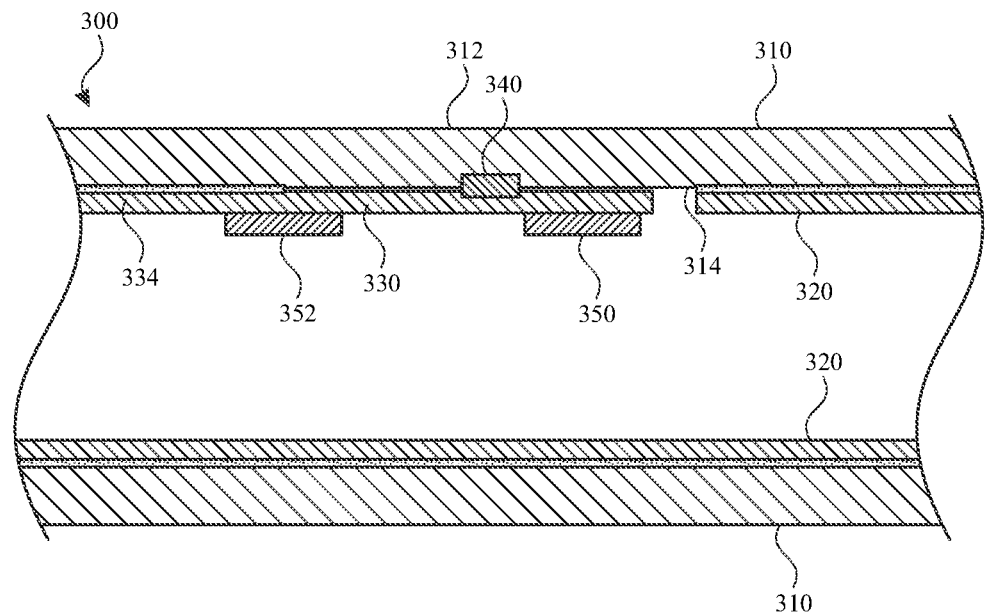
FIG. 16 illustrates a side sectional view of the stylus of FIG. 15, with a piezoelectric device in a resting state, according to some embodiments of the subject technology.

Referring now to FIGS. 15 and 16, with continued reference to FIG. 10, illustrated are front and side sectional views of the stylus 300, according to some embodiments of the subject technology. According to some embodiments, for example as illustrated in FIGS. 15 and 16, the guidetube 320 can be provided within a space encompassed by the housing 310. The guidetube 320 can be coupled to the housing 310 with an adhesive layer 322. A first piezoelectric device 350 can be disposed away from the junction 336 between the extension arm 330 and the main body 334. A second piezoelectric device 352 can be disposed at the junction 336 between the extension arm 330 and the main body 334. According to some embodiments, the stylus 300 includes a force concentrator 340 between the housing 310 and the extension arm 330 of the guidetube 320.

Figure 17:
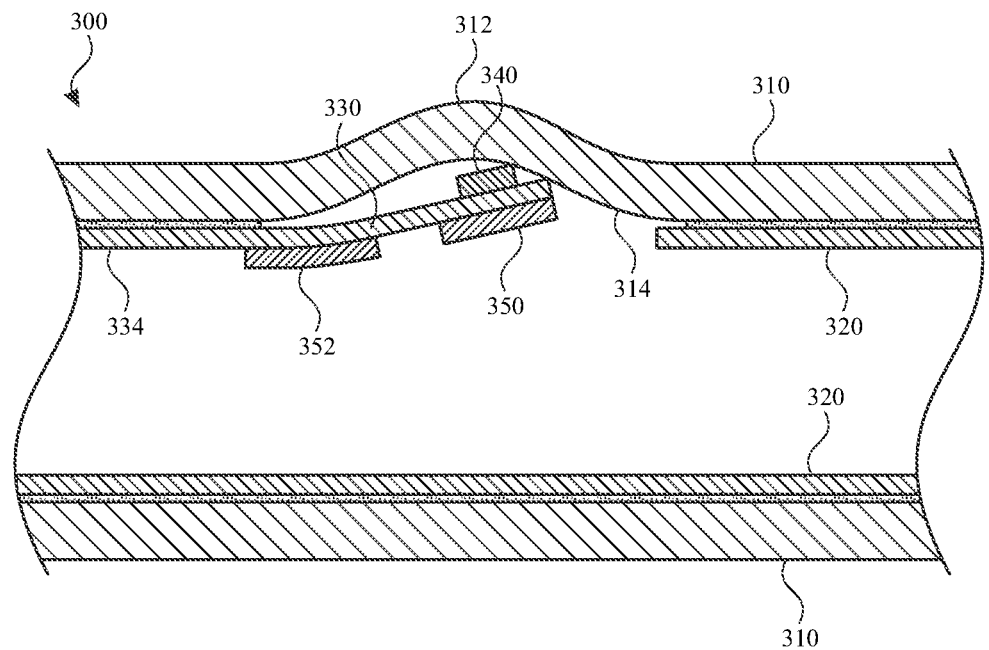
FIG. 17 illustrates a side sectional view of the stylus of FIG. 15, with the piezoelectric device in an actuated state, according to some embodiments of the subject technology.

One or both of the piezoelectric devices 350 and 352 can provide haptic feedback to a user. Referring now to FIG. 17, with continued reference to FIGS. 15 and 16, illustrated is a view of the piezoelectric device 350 in an actuated state, according to some embodiments of the subject technology. According to some embodiments, for example as illustrated in FIG. 17, the first piezoelectric device 350 provides a force to the housing 310 when an electric voltage is applied to the piezoelectric device 350. In particular, the gap 332 allows the extension arm 330 to pivot about the junction 336 so that an end region of the extension arm 330 moves against the housing 310 and transmits forces to the housing 310. The force can be transmitted via the extension arm 330 of the guidetube 320 and the force concentrator 340.

One or both of the piezoelectric devices 350 and 352 can detect tactile input from a user. Referring now to FIG. 18, with continued reference to FIGS. 15 and 16, illustrated is a view of the second piezoelectric device 352 in a deformed state, according to some embodiments of the subject technology. According to some embodiments, for example as illustrated in FIG. 17, the second piezoelectric device 352 can produce an electric voltage when an input force is applied to an outer surface 312 of the housing 310 and transmitted to the second piezoelectric device 352 via the force concentrator 340 and the extension arm 330 of the guidetube 320. In particular, as the extension arm 330 pivots about the junction 336, the second piezoelectric device 352 is deformed due to its position spanning the junction 336.

Multiple piezoelectric devices can be positioned within a stylus, for example, at the different radial, circumferential, and/or longitudinal positions. FIG. 19 illustrates a guidetube 420 of a stylus 400, according to some embodiments of the subject technology. The stylus 400 can be similar in some respects to the stylus 100 of FIGS. 1, 2, and 9 and therefore can be best understood with reference thereto. According to some embodiments, for example as illustrated in FIG. 19, the guidetube 420 includes a main body 434 and extension arms 430 that each extend from different portions of the main body 434.

Referring now to FIG. 20, with continued reference to FIG. 19, illustrated is a front sectional view of the stylus 400, according to some embodiments of the subject technology. According to some embodiments, for example as illustrated in FIG. 20, for example as illustrated in FIG. 20, the guidetube 420 can be provided within a space encompassed by the housing 410. Multiple piezoelectric devices 450 are disposed along inner surfaces 414 of corresponding extension arms 430 of the guidetube 420. As illustrated in FIG. 20, the piezoelectric devices 450 can be circumferentially distributed such that each piezoelectric device 450 has a circumferential position that is different from other piezoelectric devices 450. The piezoelectric devices 450 can be equally distributed, such that the distance between circumferentially adjacent pairs of piezoelectric devices 450 is the same. Alternatively or in combination, the piezoelectric devices 450 can have an uneven distribution. Any number of piezoelectric devices 450 can be provided. For example, the stylus 400 can include 1, 2, 3, 4, 5, 6, 7, 8, 9, or more than 9 piezoelectric devices 450. At least some of the piezoelectric devices 450 can have the same or different circumferential positions (e.g., about a perimeter of the stylus). At least some of the piezoelectric devices 450 can have the same or different longitudinal positions (e.g., relative to the tip). At least some of the piezoelectric devices 450 can have the same or different radial positions (e.g., relative to a central axis).

Figure 21:
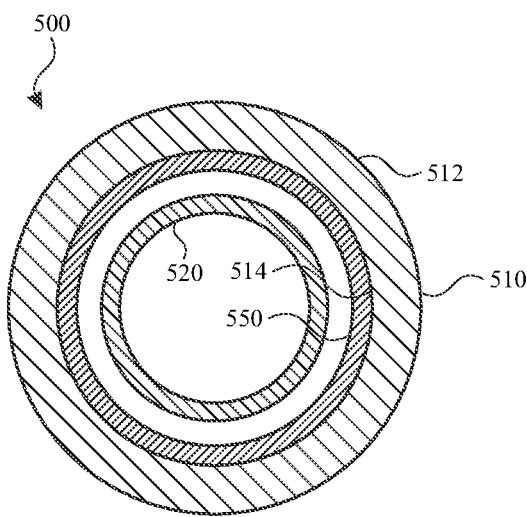
FIG. 21 illustrates a front sectional view of a stylus, according to some embodiments of the subject technology.
Figure 22:
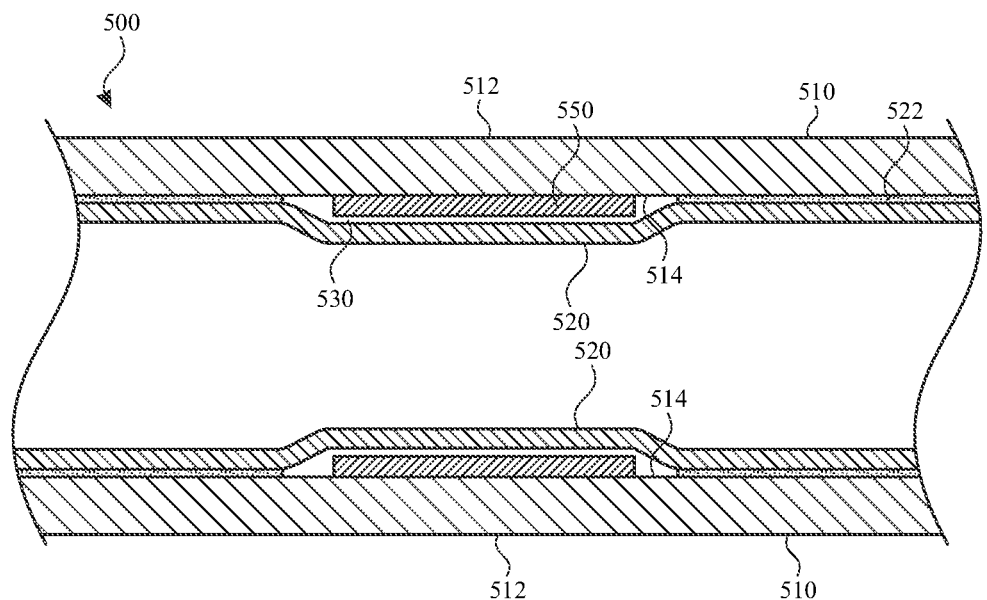
FIG. 22 illustrates a side sectional view of the stylus of FIG. 21, with a piezoelectric device in a resting state, according to some embodiments of the subject technology.

An annular piezoelectric device can extend along an entire perimeter of an inner surface of a housing. FIGS. 21 and 22 illustrate front and side sectional views of a stylus 500, according to some embodiments of the subject technology. The stylus 500 can be similar in some respects to the stylus 100 of FIGS. 1, 2, and 9 and therefore can be best understood with reference thereto. According to some embodiments, for example as illustrated in FIGS. 21 and 22, the stylus 500 includes a housing 510 with an outer surface 512 and an inner surface 514. According to some embodiments, a guidetube 520 can be provided within a space encompassed by the housing 510. The guidetube 520 can be coupled to the housing 510 with an adhesive layer 522. A piezoelectric device 550 can be disposed radially between the guidetube 520 and the housing 510. The piezoelectric device 550 can form an annular ring that extends along an entire perimeter of the inner surface 514 of the housing 510. Alternatively or in combination, the piezoelectric device 550 can extend along a portion of a perimeter of the inner surface 514. The piezoelectric device 550 and the guidetube 520 can be radially separated by an annular gap 530, so the piezoelectric device 550 is permitted to deform somewhat without contacting the guidetube 520.

Figure 23:
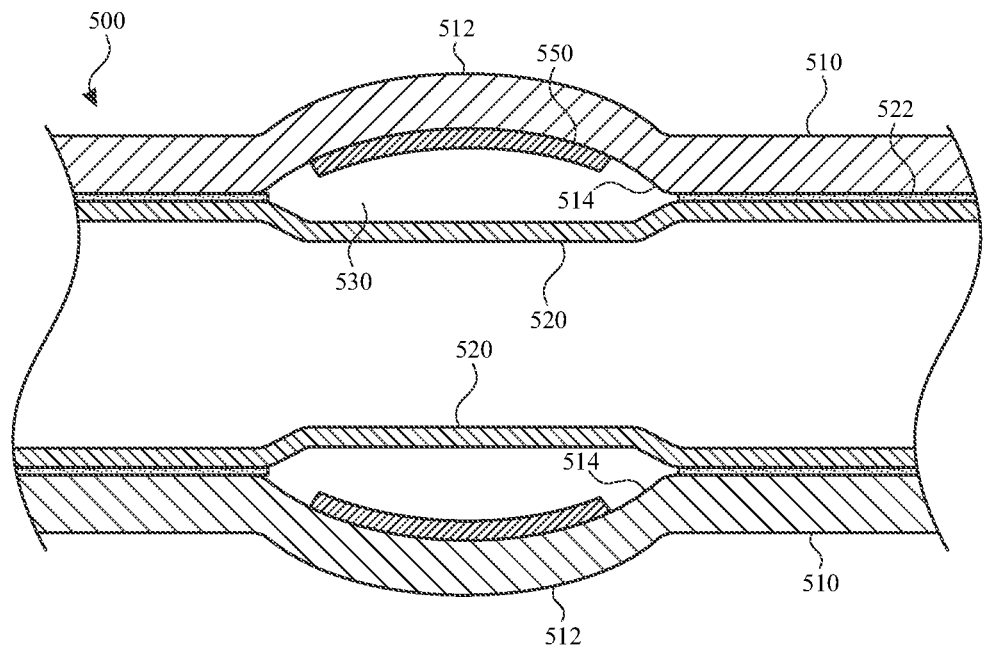
FIG. 23 illustrates a side sectional view of the stylus of FIG. 21, with the piezoelectric device in an actuated state, according to some embodiments of the subject technology.

The piezoelectric device 550 can provide haptic feedback to a user. Referring now to FIG. 23, with continued reference to FIGS. 21 and 22, illustrated is a view of the piezoelectric device 550 in an actuated state, according to some embodiments of the subject technology. According to some embodiments, for example as illustrated in FIG. 23, the piezoelectric device 550 provides a force to the housing 510 when an electric voltage is applied to the piezoelectric device 550. According to some embodiments, the piezoelectric device 550 can also detect tactile input from a user. For example, the piezoelectric device 550 can produce an electric voltage when an input force is applied to an outer surface 512 of the housing 510 and transmitted to the piezoelectric device 550.

Figure 24:
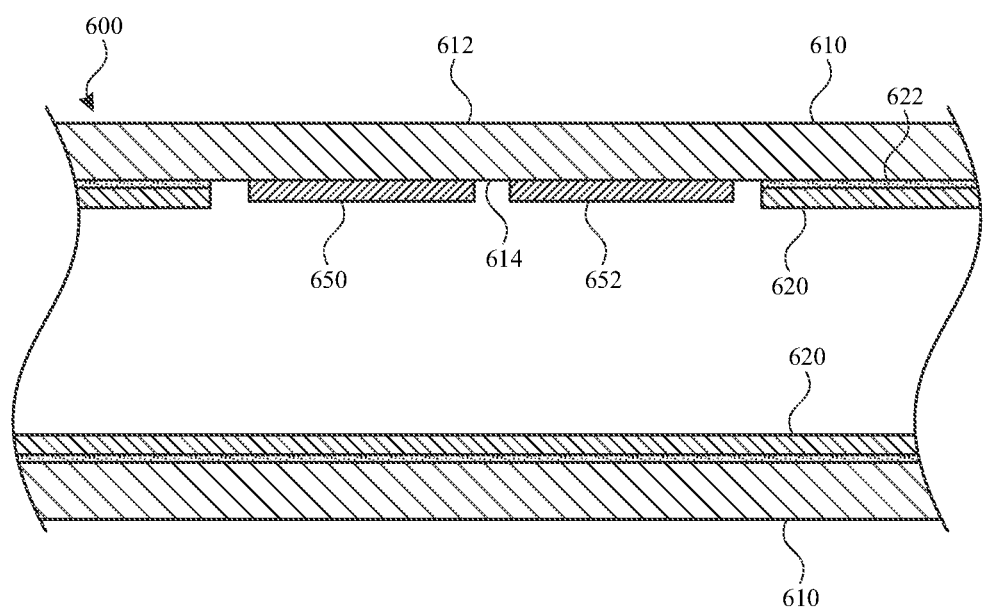
FIG. 24 illustrates a side sectional view of a stylus, with first and second piezoelectric devices in resting states, according to some embodiments of the subject technology.

Multiple piezoelectric devices can be used in concert to detect particular user inputs. FIG. 24 illustrates a side sectional view of a stylus 600, according to some embodiments of the subject technology. The stylus 600 can be similar in some respects to the stylus 100 of FIGS. 1, 2, and 9 and therefore can be best understood with reference thereto. According to some embodiments, for example as illustrated in FIG. 24, the stylus 600 can include multiple piezoelectric devices 650 and 652. The piezoelectric devices 650 and 652 can be coupled to an inner surface 612 of a housing 610. The piezoelectric devices 650 and 652 can be arranged along a line or other path. Any number of piezoelectric devices can be provided along a path. For example, the stylus 600 can include 2, 3, 4, 5, 6, 7, 8, 9, or more than 9 piezoelectric devices along a path. The stylus 600 can also include a guidetube 620 provided within a space encompassed by the housing 610. The guidetube 620 can be coupled to the housing 610 with an adhesive layer 622.

Figure 25:
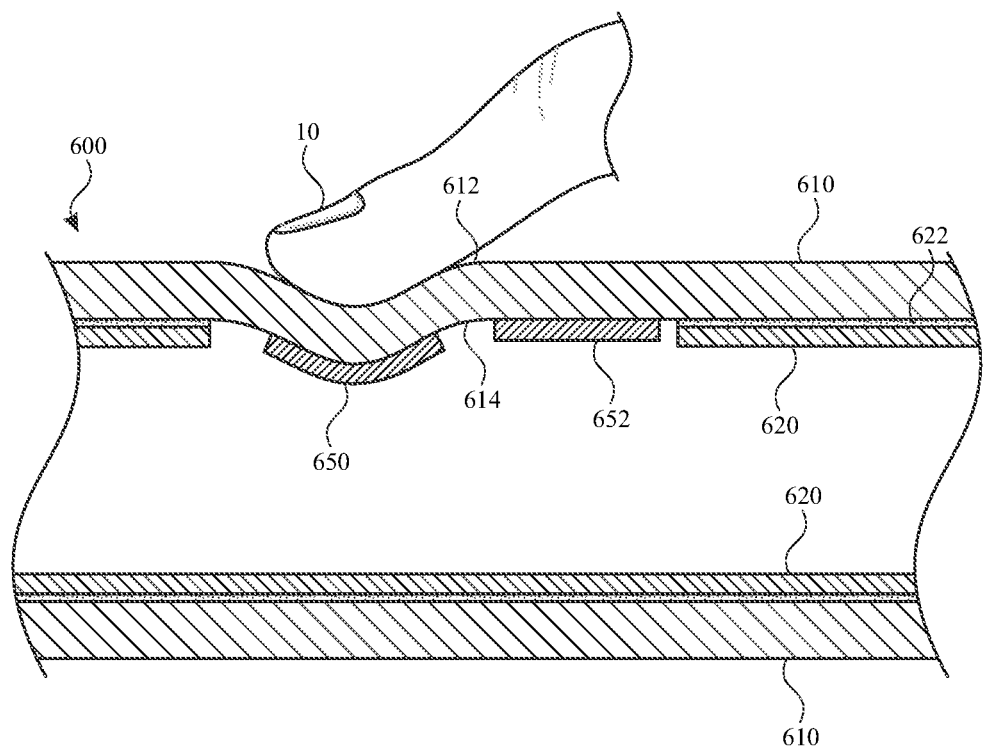
FIG. 25 illustrates a side sectional view of the stylus of FIG. 24, with the first piezoelectric device in a deformed state, according to some embodiments of the subject technology.
Figure 26:
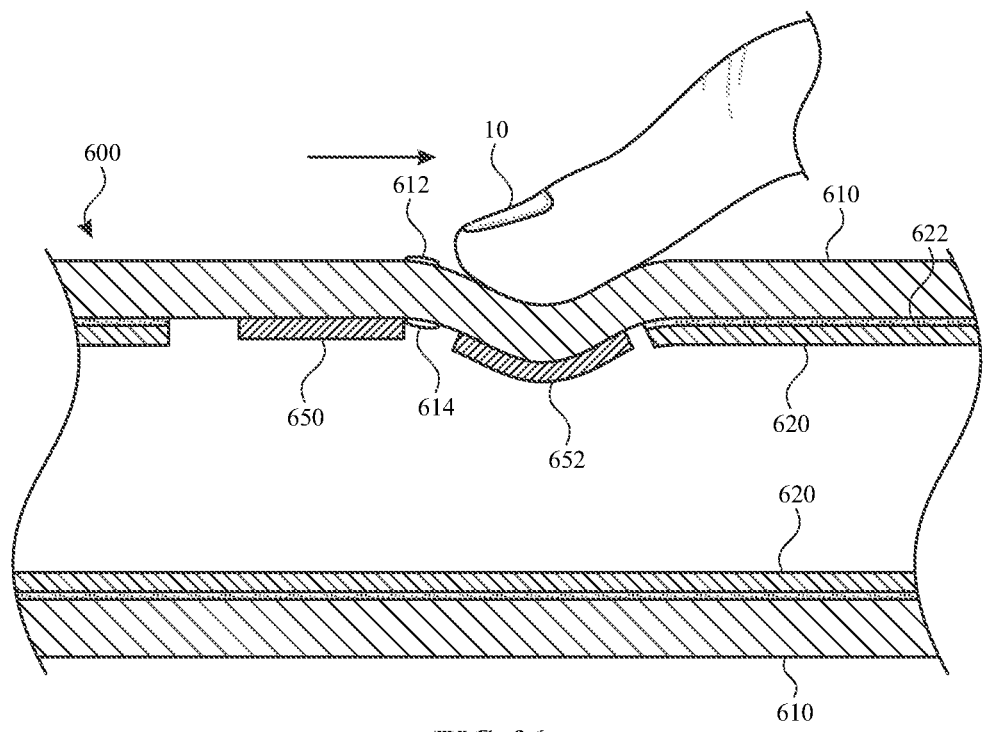
FIG. 26 illustrates a side sectional view of the stylus of FIG. 24, with the second piezoelectric device in a deformed state, according to some embodiments of the subject technology.

Referring now to FIGS. 25 and 26, with continued reference to FIG. 24, illustrated are various views of the sensing states of the stylus 600, according to some embodiments of the subject technology. According to some embodiments, for example as illustrated in FIG. 25, as a user 10 applies a force to the first piezoelectric device 650, the stylus 600 can detect the resulting voltage that is induced in the first piezoelectric device 650. As illustrated in FIG. 26, the user 10 can subsequently apply a force to the second piezoelectric device 652, and the stylus 600 can detect the resulting voltage that is induced in the second piezoelectric device 652. The sequence of forces and induced voltages within a span of time can be interpreted by the stylus 600 as a user's motion gesture in a particular direction (e.g., in a direction along a line or path defined by the arrangement of the piezoelectric devices 650 and 652). For example, the sequence of (1) a detected voltage in the first piezoelectric device 650 and then (2) a detected voltage and the second piezoelectric device 652 can be interpreted as a user motion gesture in a first direction. The sequence of (1) a detected voltage and the second piezoelectric device 652 and then (2) a detected voltage in the first piezoelectric device 650 can be interpreted as a user motion gesture in a second direction, opposite the first direction. Detected user motion gestures can be correlated with preprogrammed functions to be performed by the stylus 600 and/or an external device upon detection of the user motion gestures.

Figure 27:
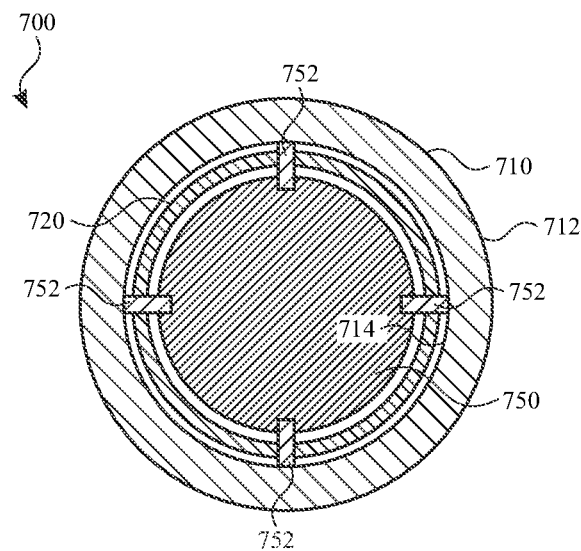
FIG. 27 illustrates a front sectional view of a stylus, according to some embodiments of the subject technology.
Figure 28:
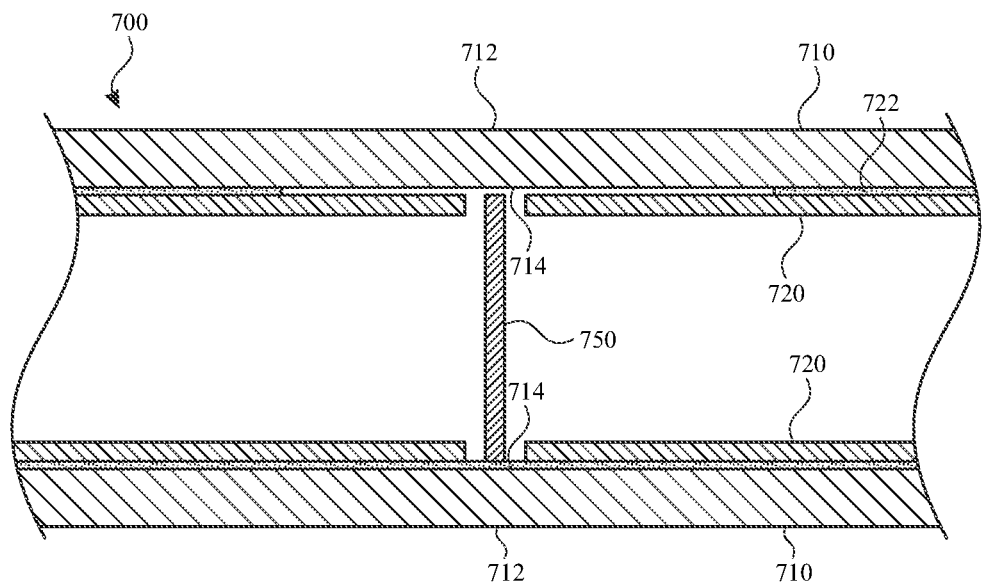
FIG. 28 illustrates a side sectional view of the stylus of FIG. 27, with a piezoelectric device in a resting state, according to some embodiments of the subject technology.

A piezoelectric device can extend between opposing sides of a housing. FIGS. 27 and 28 illustrate front and side sectional views of a stylus 700, according to some embodiments of the subject technology. The stylus 700 can be similar in some respects to the stylus 100 of FIGS. 1, 2, and 9 and therefore can be best understood with reference thereto. According to some embodiments, for example as illustrated in FIGS. 27 and 28, the stylus 700 can include a piezoelectric device 750, such as a disk, that extends between opposing sides of a housing 710. The piezoelectric device 750 can extend, for example, through a central axis of the housing 710. The housing 710 can include an outer surface 712 and an inner surface 714. The stylus 700 can also include a guidetube 720 provided within a space encompassed by the housing 710. The guidetube 720 can be coupled to the housing 710 with an adhesive layer 722. The piezoelectric device 750 can extend through opposing portions of the guidetube 720 to contact the inner surface 714 on opposing sides of the housing 710. The piezoelectric device 750 can include one or more extensions 752 that extend radially from a central portion of the piezoelectric device 750 to extend through gaps in the guidetube 720. Any number of extension 752 can be provided. For example, the piezoelectric device 750 can include can include 1, 2, 3, 4, 5, 6, 7, 8, 9, or more than 9 extensions 752. The piezoelectric device 750 can be stabilized between longitudinally opposite portions of the guidetube 720, such that longitudinal mobility of the piezoelectric device 750 is limited by the guidetube 720.

Figure 29:
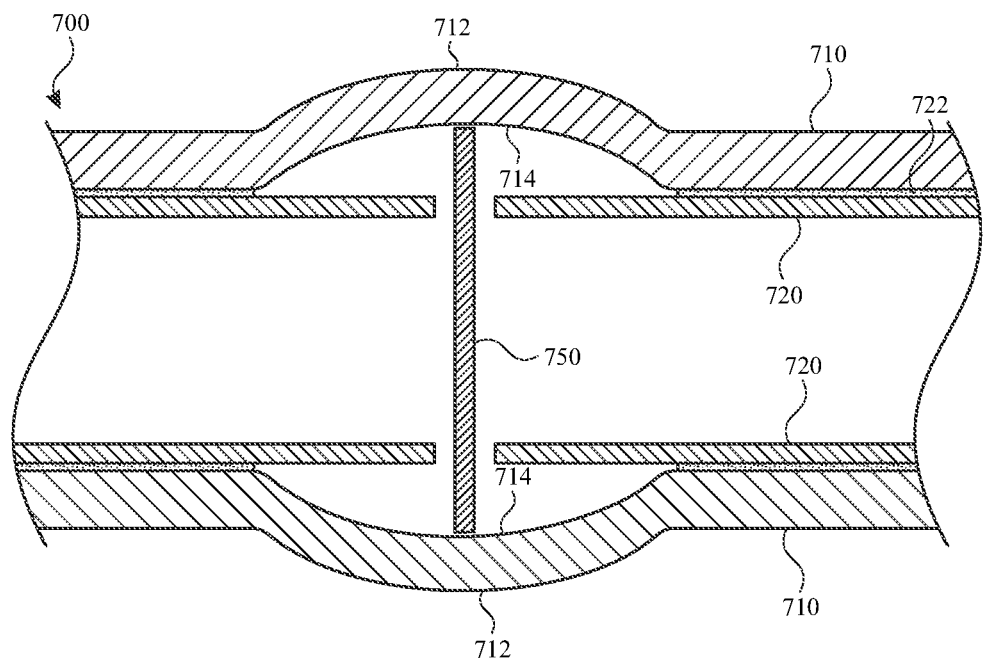
FIG. 29 illustrates a side sectional view of the stylus of FIG. 27, with the piezoelectric device in an actuated state, according to some embodiments of the subject technology.

The piezoelectric device 750 can provide haptic feedback to a user. Referring now to FIGS. 28 and 29, with continued reference to FIG. 27, illustrated are various views of the haptic feedback states of the stylus 700, according to some embodiments of the subject technology. According to some embodiments, for example as illustrated in FIG. 27, the piezoelectric device 750 (e.g., the extensions 752) provides a force to the housing 710 when an electric voltage is applied to the piezoelectric device 750. According to some embodiments, the piezoelectric device 750 can also detect tactile input from a user. For example, the piezoelectric device 750 can produce an electric voltage when an input force is applied to an outer surface 712 of the housing 710 and transmitted to the piezoelectric device 750 (e.g., via the extensions 752).

According to some embodiments, one or more features of the stylus 100, the stylus 200, the stylus 300, the stylus 400, the stylus 500, the stylus 600, and/or the stylus 700 can be combined in a single device. For example, an input device of the subject technology can include one or more piezoelectric devices 150, one or more piezoelectric devices 250, one or more first piezoelectric devices 350, one or more second piezoelectric devices 352, one or more piezoelectric devices 450, one or more piezoelectric devices 550, one or more first piezoelectric devices 650, one or more second piezoelectric devices 652, and/or one or more piezoelectric devices 750. According to some embodiments, any one or more of the piezoelectric devices can be used for providing haptic feedback to a user. According to some embodiments, any one or more of the piezoelectric devices can be used for detecting tactile input from a user.

Figure 30:
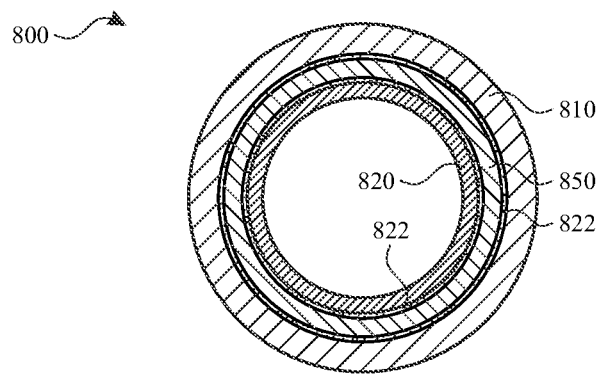
FIG. 30 illustrates a front sectional view of a stylus, according to some embodiments of the subject technology.
Figure 31:
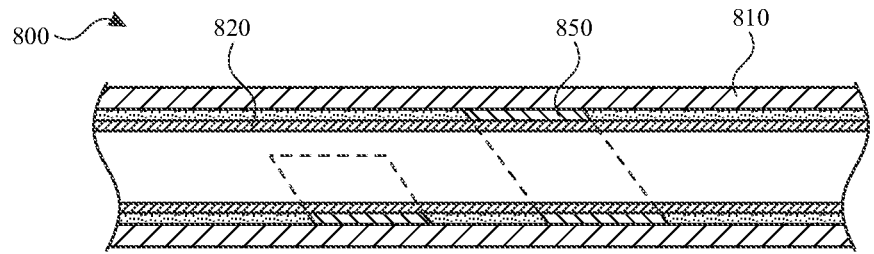
FIG. 31 illustrates a side sectional view of the stylus of FIG. 30, according to some embodiments of the subject technology.

A piezoelectric device can follow a helical path along a portion of a stylus. The helical path can allow the piezoelectric device to provide tactile input detection and/or haptic feedback at a variety of circumferential locations across a given length of the stylus. FIGS. 30 and 31 illustrate front and side sectional views of a stylus 800, according to some embodiments of the subject technology. The stylus 800 can be similar in some respects to the stylus 100 of FIGS. 1, 2, and 9 and therefore can be best understood with reference thereto. According to some embodiments, for example as illustrated in FIGS. 30 and 31, the stylus 800 includes a housing 810 and a guidetube 820, which can be provided within a space encompassed by the housing 810. A piezoelectric device 850 can be disposed radially between portions of the guidetube 820 and the housing 810. Layers of the housing 810, the guidetube 820, and the piezoelectric device 850 can be coupled together with an adhesive 822. The piezoelectric device 850 can form a helix that extends between the guidetube 820 and the housing 810. The helical shape of the piezoelectric device 850 can extend circumferentially at least one turn within the housing 810. The piezoelectric device 850 can be directly coupled to the guidetube 820 and/or the housing 810. Alternatively or in combination, the piezoelectric device 850 can be directly coupled to only one of the guidetube 820 and the housing 810 and be separated from the other by a radial gap. Multiple piezoelectric devices 850 can be used in concert to provide haptic feedback at various longitudinal locations and/or detect particular user inputs. For example, multiple piezoelectric devices 850 can be arranged at various longitudinal locations in a manner similar to the arrangement of the stylus 600, as shown in FIGS. 24-26.

Figure 32:
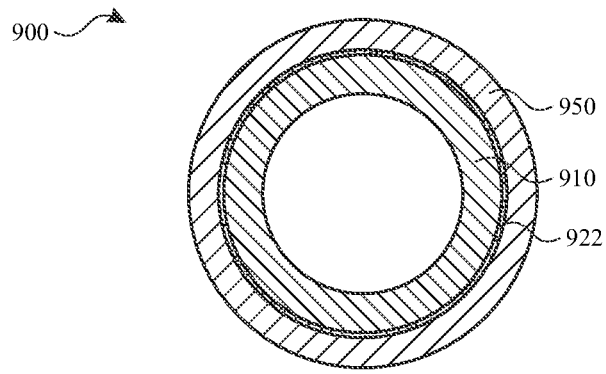
FIG. 32 illustrates a front sectional view of a stylus, according to some embodiments of the subject technology.
Figure 33:
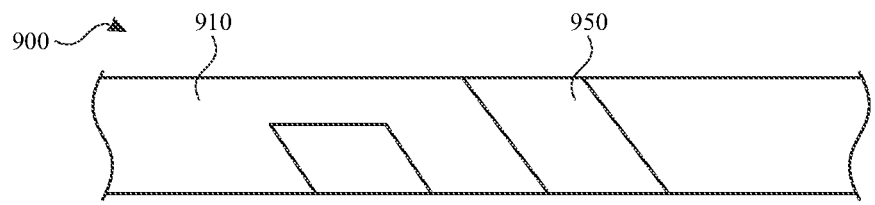
FIG. 33 illustrates a side view of the stylus of FIG. 32, according to some embodiments of the subject technology.

A piezoelectric device can be provided on an outer surface of a housing of a stylus. The position of the piezoelectric device on the outer surface can provide tactile input detection and/or haptic feedback immediately adjacent to the grip of a user. FIGS. 32 and 33 illustrate front and side sectional views of a stylus 900, according to some embodiments of the subject technology. The stylus 900 can be similar in some respects to the stylus 100 of FIGS. 1, 2, and 9 and therefore can be best understood with reference thereto. According to some embodiments, for example as illustrated in FIGS. 32 and 33, the stylus 900 includes a housing 910 and a piezoelectric device 950 disposed on the housing 910. The housing 910 and the piezoelectric device 950 can be coupled together with an adhesive 922. The piezoelectric device 950 can form a helix or another shape, such as an annular ring, a longitudinally extending segment, or another shape described herein. Multiple piezoelectric devices 950 can be used in concert to provide haptic feedback at various longitudinal locations and/or detect particular user inputs. For example, multiple piezoelectric devices 950 can be arranged at various longitudinal locations in a manner similar to the arrangement of the stylus 600, as shown in FIGS. 24-26.

Figure 34:
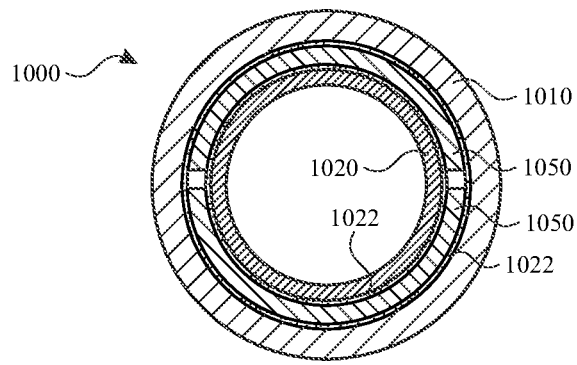
FIG. 34 illustrates a front sectional view of a stylus, according to some embodiments of the subject technology.
Figure 35:
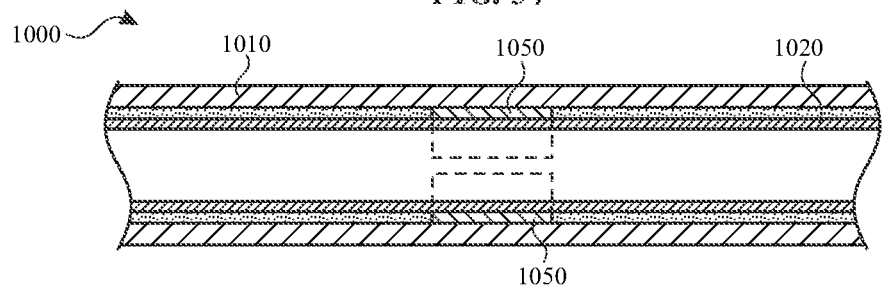
FIG. 35 illustrates a side sectional view of the stylus of FIG. 34, according to some embodiments of the subject technology.

A piezoelectric device or multiple piezoelectric devices can extend circumferentially within a stylus to provide tactile input detection and/or haptic feedback at a variety of circumferential locations. FIGS. 34 and 35 illustrate front and side sectional views of a stylus 1000, according to some embodiments of the subject technology. The stylus 1000 can be similar in some respects to the stylus 100 of FIGS. 1, 2, and 9 and therefore can be best understood with reference thereto. According to some embodiments, for example as illustrated in FIGS. 34 and 35, the stylus 1000 includes a housing 1010 and a guidetube 1020, which can be provided within a space encompassed by the housing 1010. Piezoelectric devices 1050 can be disposed radially between portions of the guidetube 1020 and the housing 1010. Layers of the housing 1010, the guidetube 1020, and the piezoelectric devices 1050 can be coupled together with an adhesive 1022. The piezoelectric devices 1050 can form arcs that extend circumferentially between the guidetube 1020 and the housing 1010. Where multiple piezoelectric devices 1050 are provided, the multiple piezoelectric devices 1050 can be circumferentially adjacent to each other to provide a combined structure. The combined structure extends across all or most of an entire circumference. Alternatively or in combination, a single piezoelectric device 1050 can extend an entire, continuous circumference. Multiple piezoelectric devices 1050 can be used in concert to provide haptic feedback at various longitudinal locations and/or detect particular user inputs. For example, multiple piezoelectric devices 1050 can be arranged at various longitudinal locations in a manner similar to the arrangement of the stylus 600, as shown in FIGS. 24-26.

Figure 36:
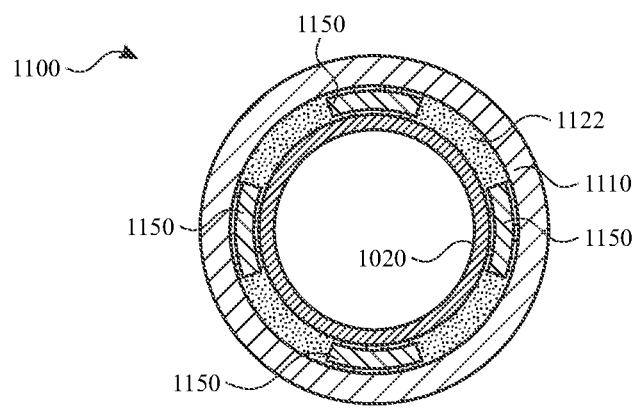
FIG. 36 illustrates a front sectional view of a stylus, according to some embodiments of the subject technology.
Figure 37:
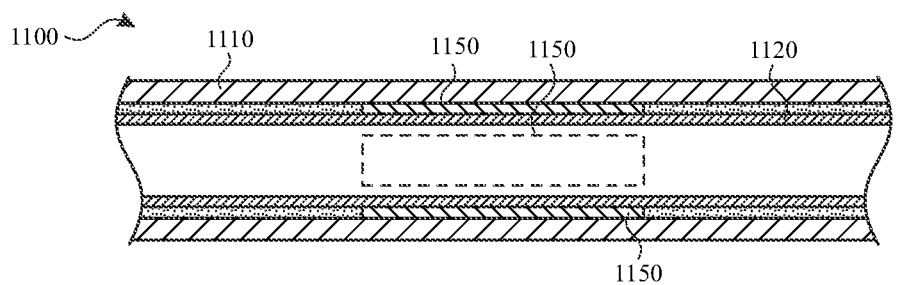
FIG. 37 illustrates a side sectional view of the stylus of FIG. 36, according to some embodiments of the subject technology.

Multiple piezoelectric devices can be distributed about a circumference to provide tactile input detection and/or haptic feedback at selected circumferential locations. FIGS. 36 and 37 illustrate front and side sectional views of a stylus 1100, according to some embodiments of the subject technology. The stylus 1100 can be similar in some respects to the stylus 100 of FIGS. 1, 2, and 9 and therefore can be best understood with reference thereto. According to some embodiments, for example as illustrated in FIGS. 36 and 37, the stylus 1100 includes a housing 1110 and a guidetube 1120, which can be provided within a space encompassed by the housing 1110. Piezoelectric devices 1150 can be disposed radially between portions of the guidetube 1120 and the housing 1110. Layers of the housing 1110, the guidetube 1120, and the piezoelectric devices 1150 can be coupled together with an adhesive 1122. The piezoelectric devices 1150 can be distributed at selected circumferential locations between the guidetube 1120 and the housing 1110. Each circumferentially adjacent pair of piezoelectric devices 1150 can be separated by a circumferential gap (e.g., filled with the adhesive 1122). The location of the piezoelectric devices 1150 can be selected to effectively provide adequate tactile input detection and/or haptic feedback without excessive coverage. The reduced size of the piezoelectric devices 1150 can focus activity where it is most effective. For example, the piezoelectric devices 1150 can be arranged to align with a location of a user's grip. Multiple piezoelectric devices 1150 can be used in concert to provide haptic feedback at various longitudinal locations and/or detect particular user inputs. For example, multiple piezoelectric devices 1150 can be arranged at various longitudinal locations in a manner similar to the arrangement of the stylus 600, as shown in FIGS. 24-26.

Figure 38:
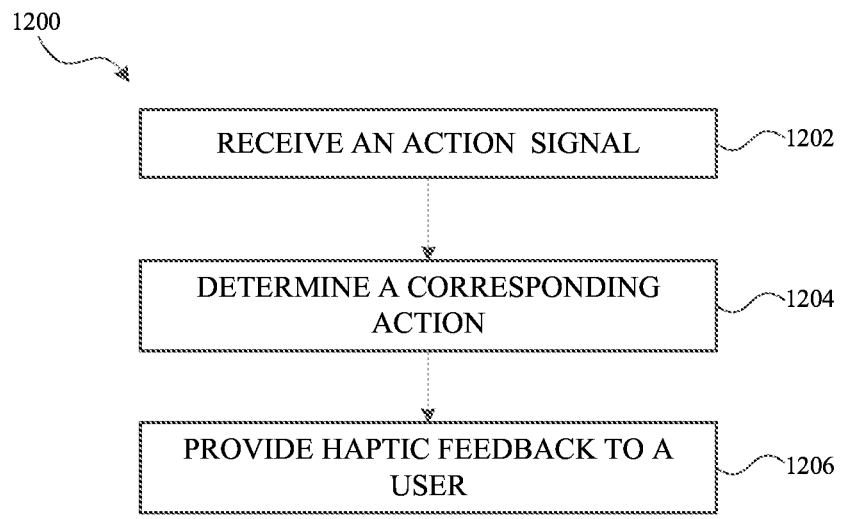
FIG. 38 illustrates a flow chart of an example process for providing haptic feedback, according to some embodiments of the subject technology.

According to some embodiments, a method 1200 can be employed to manage the haptic feedback that is provided to the user. FIG. 38 illustrates a flow chart of an example process for providing haptic feedback, according to some embodiments of the subject technology. According to some embodiments, for example as illustrated at block 1202 of FIG. 38, a stylus (e.g., input device) can receive an action signal. The action signal can be received from an external device, such as via the communication component 166 of the stylus. For example, an action signal from an external device can include an indication (e.g., confirmation) that a selection has been received by the external device from the user. By further example, an action signal from an external device can include a notification, alert, or alarm managed by the external device. An action signal from an external device can include information regarding operation of the stylus in conjunction with the external device. For example, an action signal from an external device can confirm the occurrence and/or a characteristic of contact between the stylus and the external device, such as when contact is made and the magnitude of force applied. According to some embodiments, the action signal can be received from a component of the stylus, such as a tip sensor, an accelerometer, a gyroscope, or a piezoelectric device of the stylus. An action signal from a component of the stylus can indicate that a user-applied input has been detected. An action signal from a component of the stylus can indicate a position and/or orientation of the stylus.

According to some embodiments, for example as illustrated at block 1204 of FIG. 38, receipt of the action signal at the stylus can prompt the stylus to determine a corresponding action. Such a determination can be performed, for example, by the controller 160 and/or the storage medium 162 of the stylus. The origin of the action signal and/or a characteristic thereof can be analyzed and compared to preprogrammed actions to be performed by the stylus. Preprogrammed actions can be stored in a storage medium of the stylus. For example, a lookup table can include a record of action signals with associated actions to be performed by the stylus. Action signals can be compared to a threshold to determine whether a corresponding action should be performed. Other factors, such as whether a piezoelectric device of the stylus is receiving an input from a user, can be considered to determine whether a corresponding action should be performed.

According to some embodiments, for example as illustrated at block 1206 of FIG. 38, the stylus can provide haptic feedback to a user based on the determined action. The haptic feedback can be provided, for example, by the piezoelectric device based on operation of the controller 160. Upon determining a corresponding action, the stylus (e.g., via the controller 160) can operate a piezoelectric device to provide haptic feedback to user. According to some embodiments, the haptic feedback can be provided in accordance with the corresponding action that is determined based on the action signal. For example, the haptic feedback via the stylus can inform the user regarding status or operation of the external device.

According to some embodiments, the haptic feedback can enhance operation of the stylus. For example, operation of the piezoelectric device can render texture sensations to simulate drawing on a textured surface with the stylus. Vibrations can be transmitted to the user from the piezoelectric device as the stylus is determined to be moving across a surface of an external device. The force of the contact, the speed of the stylus, the orientation of the stylus, and/or the textured surface to be simulated can be considered to determine the operation of the piezoelectric device.

Figure 39:
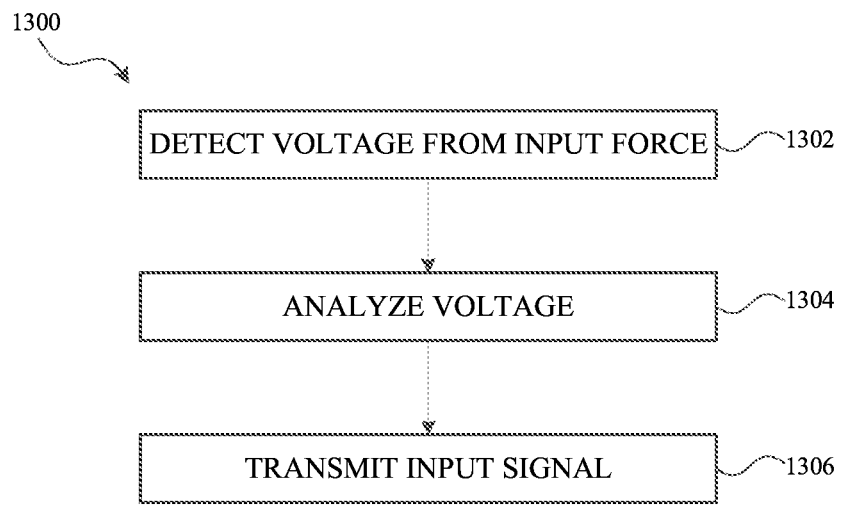
FIG. 39 illustrates a flow chart of an example process for detecting a user input, according to some embodiments of the subject technology.

According to some embodiments, a method 1300 can be employed to detect tactile input from a user. FIG. 39 illustrates a flow chart of an example process for detecting a user input, according to some embodiments of the subject technology. According to some embodiments, for example as illustrated at block 1302 of FIG. 38, a voltage can be detected across a piezoelectric device of a stylus (e.g., input device). The voltage can be induced by an input force from a user, for example applied to a housing of the stylus. The voltage can be detected passively, without requiring a power source to detect a change in voltage. According to some embodiments, a magnitude, duration, and/or change of the voltage can be detected. Voltage is across one or more piezoelectric devices can be detected for further analysis.

According to some embodiments, for example as illustrated at block 1304 of FIG. 39, the voltage across a piezoelectric device can be analyzed to interpret a characteristic of an input force from a user. Such analysis can be performed, for example, by the controller 160 and/or the storage medium 162 of the stylus. According to some embodiments, the characteristic of the input force can include a magnitude, duration, and/or change of the input force. For example, as discussed herein and illustrated in FIGS. 7 and 8, characteristics of the input force can be inferred from the resulting voltage across a piezoelectric device.

According to some embodiments, the input force can be the sensing function can be performed while the piezoelectric device 150 is providing haptic feedback, for example, by detecting a voltage across the piezoelectric device 150 and compensating for a known or expected offset due to performance of the haptic feedback function. Where sensing and haptic feedback are provided by the same piezoelectric device, the sensing can be performed while the piezoelectric device is providing haptic feedback by detecting a voltage across the piezoelectric device and compensating for a known or expected offset due to performance of the haptic feedback function.

According to some embodiments, the stylus can compensate for a known or expected decay of the voltage across the piezoelectric device. As discussed herein, a sustained or constant user-applied force would produce an initial voltage that would eventually decay entirely. The stylus can utilize a charge amplifier to compensate for the decay in voltage or calculate a theoretical voltage based on the known or expected decay during the time span of a user input.

According to some embodiments, a characteristic of the input force can be compared to preprogrammed thresholds and/or converted to a value that is transmitted as an input signal. The value can be proportionate to or otherwise based on one or more characteristics of the input force.

According to some embodiments, for example as illustrated at block 1306 of FIG. 39, and input signal can be transmitted from the stylus based on the input force and analysis thereof. The transmission can be performed, for example, by the communication component 166 based on operation of the controller 160. The input signal can be transmitted to an external device and/or other components of the stylus. The input signal can include information relating to a characteristic of the input force. For example, the input signal can include a value that represents a magnitude of the input force and/or that the input force exceeds a threshold.

According to some embodiments, the stylus and/or an external device can be provided with instructions to perform certain actions upon receipt of the input signal. For example, an external device can interpret receipt of the input signal as a user selection. The subject of the user selection can be further indicated, for example, by contact of the stylus (e.g., the tip of the stylus) on a surface of the external device.

According to some embodiments, the external device can record receipt of the input signal and apply a corresponding action in response to subsequent inputs from the stylus. For example, the stylus can be used for drawing or writing by contacting the surface of the external device with the tip of the stylus. Such input can be recorded by the external device with markings, lines, or shapes having a variety of characteristics. For example, the recorded markings can have a certain shape, thickness, and color. When the user operates the piezoelectric device to create an input signal, the external device can interpret the input signal as a command to apply one or more characteristics to markings generated by subsequent input from the stylus. Accordingly, subsequent contact between the tip of the stylus and the surface of the external device can be recorded as markings having the one or more characteristics determined by the input signal. According to some embodiments, the input signal generated by operation of the piezoelectric device can toggle a setting that interprets subsequent inputs as either drawing new markings (e.g., drawing mode) or erasing existing markings (e.g., eraser mode). According to some embodiments, during receipt of an input signal generated by operation of the piezoelectric device, inputs from the tip of the stylus can be interpreted based on the input signal. For example, an input signal that corresponds to a magnitude of a force applied to the piezoelectric device can command the external device to interpret simultaneous inputs from the tip of the stylus with markings that have a thickness proportionate to the magnitude of the force. Drawing with the stylus during application of a force above a threshold or within a higher range can result in thicker markings, and drawing with the stylus during application of a force below the threshold or within a lower range can result in thinner markings. Multiple ranges and thresholds can apply to the detected voltage to provide a range of possible input signals.

According to some embodiments, the characteristic of the input force can include a direction, pathway, speed, and/or length of a user motion gesture providing the input force. For example, a stylus can track a user motion gesture across multiple piezoelectric devices and detect input forces applied in sequence to each of the multiple piezoelectric devices. The combined input can be used to detect a direction, pathway, speed, and/or length of the user motion gesture across the multiple piezoelectric devices. The stylus or the external device can interpret the resulting input signal as a command to perform a function in accordance with the characteristic. According to some embodiments, the input signal can change a setting of the external device based on the input signal. For example, the external device can change volume, brightness, display zoom, marking characteristic, or other features of the external device to an extent that is proportionate to the characteristic (e.g., length) of the user motion gesture. For example, applying a user motion gesture in a first direction across the piezoelectric devices can increase a setting value (e.g., volume, marking thickness, etc.) of the external device, and applying a user motion gesture across the piezoelectric devices in a second direction, opposite the first direction, can decrease the setting value of the external device.

Various functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "processor", and "memory" all refer to electronic or other technological devices. These terms exclude people or groups of people. For the purposes of the specification, the terms "display" or "displaying" means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device as described herein for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Some of the blocks may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "example" is used herein to mean "serving as an example or illustration." Any aspect or design described herein as "example" is not necessarily to be construed as preferred or advantageous over other aspects or design All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A stylus, comprising:
a housing comprising a user grip region on an outer surface of the housing, wherein the housing extends continuously to define an outer periphery of the stylus; and
a guidetube coupled to an inner surface of the housing, the guidetube forming an opening to the inner surface of the housing; and
a piezoelectric device positioned within the opening and against the inner surface of the housing at the user grip region;
wherein the user grip region of the housing is deformable, such that an input force that deforms the user grip region of the housing into the opening is transmitted to the piezoelectric device to produce an electric voltage and such that haptic feedback provided by the piezoelectric device deforms the user grip region away from the opening.

2. The stylus of claim 1, wherein at least a portion of the inner surface of the housing or at least a portion of an outer surface of the housing is flat.

3. The stylus of claim 1, wherein the piezoelectric device extends annularly along an entire perimeter of the inner surface of the housing.

4. The stylus of claim 3, further comprising a guidetube extending annularly within the piezoelectric device, wherein the guidetube is coupled to the housing on opposing sides of the piezoelectric device, and wherein the piezoelectric device and the guidetube are radially separated by an annular gap.

5. The stylus of claim 1, further comprising an additional piezoelectric device, wherein the piezoelectric device and the additional piezoelectric device are disposed at different circumferential locations along the inner surface of the housing.

6. The stylus of claim 1, further comprising an additional piezoelectric device, wherein the piezoelectric device and the additional piezoelectric device are arranged along a line.

7. The stylus of claim 1, wherein the piezoelectric device is coupled to and extends between opposing sides of the inner surface of the housing.

8. The stylus of claim 1, wherein the piezoelectric device forms a helical shape.

9. A stylus, comprising:
a housing forming an input component for receiving an input force from a user at a user grip region of the stylus, the housing extending continuously about a longitudinal axis of the stylus to define an outer periphery of the stylus;
a piezoelectric device coupled to the input component, wherein the piezoelectric device produces an input signal when the input force is applied to the input component and transmitted to the piezoelectric device, and wherein the piezoelectric device provides haptic feedback to the user via the input component; and
a communication component to communicate the input signal to an external device, wherein the haptic feedback is provided in response to an action signal received from the external device.

10. The stylus of claim 9, wherein the input signal comprises instructions to alter a setting of the external device.

11. The stylus of claim 9, wherein the haptic feedback is provided upon confirmation that the input signal has been received by the external device.

12. A method, comprising:
sensing, with a piezoelectric device of a stylus, an input force applied to a user grip region of the stylus and transmitted to the piezoelectric device, the user grip region being located at a housing of the stylus that extends continuously about a longitudinal axis of the stylus to define an outer periphery of the stylus, the input force deforming the user grip region toward the longitudinal axis;
transmitting, from the stylus and to an external device, an input signal as an indication of the input force;
receiving an action signal from the external device; and
based on the action signal, providing haptic feedback with a force to the user grip region of the stylus by applying an electric voltage to the piezoelectric device to deform the user grip region away from the longitudinal axis.

13. The method of claim 12, wherein the input signal comprises an indication of an input sensed by the piezoelectric device.

14. The method of claim 12, wherein the action signal comprises a confirmation that the input signal was received by the external device.

15. The method of claim 12, wherein the input signal comprises instructions for the external device to apply an action upon receipt of an input sensed by a tip sensor at a tip of the stylus.

16. The method of claim 12, wherein the transmitting is performed only if the input force exceeds a threshold.

* * * * *